(12) United States Patent
Bryll

(10) Patent No.: US 10,880,468 B1
(45) Date of Patent: Dec. 29, 2020

(54) METROLOGY SYSTEM WITH TRANSPARENT WORKPIECE SURFACE MODE

(71) Applicant: Mitutoyo Corporation, Kanagawa-ken (JP)

(72) Inventor: Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 16/720,432

(22) Filed: Dec. 19, 2019

(51) Int. Cl.
*H04N 5/00* (2011.01)
*G01N 21/88* (2006.01)
*G02B 21/36* (2006.01)
*H04N 5/232* (2006.01)

(52) U.S. Cl.
CPC ......... *H04N 5/23212* (2013.01); *G01N 21/88* (2013.01); *G02B 21/361* (2013.01); *G02B 21/367* (2013.01); *G02B 21/368* (2013.01)

(58) Field of Classification Search
CPC ... H04N 5/23212; G01N 21/88; G02B 21/367
USPC ........................................................ 348/135
See application file for complete search history.

(56) References Cited

U.S. PATENT DOCUMENTS

| | | | |
|---|---|---|---|
| 6,542,180 B1 | 4/2003 | Wasserman et al. | |
| 7,030,351 B2 | 4/2006 | Wasserman et al. | |
| 7,324,682 B2 | 1/2008 | Wasserman | |
| 7,454,053 B2 | 11/2008 | Bryll et al. | |
| 7,570,795 B2 | 8/2009 | Yu et al. | |
| 7,627,162 B2 | 12/2009 | Blanford et al. | |
| 8,111,905 B2 | 2/2012 | Campbell | |
| 8,111,938 B2 | 2/2012 | Bryll et al. | |
| 8,318,094 B1* | 11/2012 | Bayandorian | ........ G01N 21/645 422/63 |
| 8,581,162 B2 | 11/2013 | Campbell | |
| 8,928,874 B2 | 1/2015 | Patzwald | |
| 9,060,117 B2 | 6/2015 | Bryll et al. | |
| 9,143,674 B2 | 9/2015 | Gladnick | |
| 9,830,694 B2 | 11/2017 | Bryll | |

OTHER PUBLICATIONS

Mitutoyo Corporation & Micro Encoder Inc. "QVPAK® 3D CNC Vision Measuring Machine," User's Guide, Version 7, 2003, 329 pages.

* cited by examiner

*Primary Examiner* — Jeffery A Williams
(74) *Attorney, Agent, or Firm* — Seed IP Law Group LLP

(57) ABSTRACT

A metrology system is provided with a transparent workpiece surface mode, for which the system is configured to vary a focus position over a plurality of positions along a Z height direction proximate to a workpiece. An image stack is acquired, wherein each image of the image stack includes a first surface (e.g., an upper surface of the workpiece) that is transparent or semi-transparent and at least a second surface that is at least partially viewable through the first surface. A plurality of focus curves are determined based on the image stack (e.g., with pattern projection utilized for improved contrast), from which first, second, etc. local focus peaks may be determined from each focus curve that correspond to the first, second, etc. surfaces, respectively. An image is displayed (e.g., extended depth of field, 3D) including a selected surface and for which features of the selected/displayed surface may be measured.

23 Claims, 12 Drawing Sheets

US 10,880,468 B1

METROLOGY SYSTEM WITH TRANSPARENT WORKPIECE SURFACE MODE

BACKGROUND

Technical Field

This disclosure relates to precision metrology, and more particularly to metrology systems utilizing points from focus and similar operations for inspecting and measuring workpiece surfaces.

Description of the Related Art

Precision metrology systems such as machine vision inspection systems (or "vision systems" for short) may be used for precise measurements of objects and to inspect other object characteristics. Such systems may include a computer, camera, optical system, and a stage that moves to allow workpiece traversal. One exemplary system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of small or large workpieces at various magnifications.

Such machine vision inspection systems are generally programmable to provide automated inspection. The machine control instructions including the specific inspection event sequence—i.e., sequential image acquisition settings (e.g., position, lighting, magnification, etc.) and how to analyze/inspect each image (e.g., using one or more video tools) are stored as a "part program" or "workpiece program" that is specific to the particular workpiece configuration.

Video tools (or "tools" for short) and other graphical user interface (GUI) features allow operations and programming by "non-expert" operators. Such tools may be used manually in "manual mode", and/or their parameters and operation can also be recorded during learn mode, in order to create part programs. Video tools may include, for example, edge-/boundary-detection tools, autofocus tools, shape- or pattern-matching tools, dimension-measuring tools, and the like. U.S. Pat. Nos. 6,542,180 and 7,627,162, each of which is hereby incorporated herein by reference in its entirety, teach vision systems including the use of video tools for inspection programming.

One known type of video tool is a "multipoint tool" or a "multipoint autofocus tool" video tool. Such a tool (and/or various other processes utilizing similar techniques) may provide Z-height measurements or coordinates (along the optical axis and focusing axis of the camera system) derived from a "best focus" position for a plurality of sub-regions at defined X-Y coordinates within a region of interest of the tool, such as determined by an autofocus method. A set of such X, Y, Z coordinates may be referred as point cloud data, or a point cloud, for short. In general, according to prior art autofocus methods and/or tools, the camera moves through a range of positions along a z-axis (the focusing axis) and captures an image at each position (referred to as an image stack). For each captured image, a focus metric is calculated for each sub-region (i.e., with given X and Y coordinates) based on the image and related to the corresponding position of the camera along the Z-axis at the time that the image was captured. This results in focus curve data for each XY sub-region, which may be referred to simply as a "focus curve" or "autofocus curve." The peak of the focus curve, which corresponds to the best focus position along the z-axis, may be found by fitting a curve to the focus curve data and estimating the peak of the fitted curve.

Utilizing the data acquired from such techniques, various types of images of a workpiece may be displayed. For example, a 3 dimensional (3D) image of a workpiece may be displayed utilizing the point cloud data as described above. As another example, for some applications it may be desirable to display an image with an extended depth of field (EDOF), that is larger than that provided by the optical imaging system at a single focus position. One method for constructing an EDOF image includes techniques similar to some of those described above, including the collecting of an image stack, consisting of a plurality of congruent or aligned images focused at different distances within a focus range. A composite image is constructed, wherein each portion of the field of view is extracted from the particular image that shows that portion with the best focus (i.e., as determined in accordance with a peak of a focus curve).

Such techniques for imaging and measuring surfaces have typically faced various challenges for certain types of workpiece surfaces (e.g., transparent surfaces, etc.) An improved system that can accommodate the imaging and measuring of a variety of types of workpiece surfaces would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided with a transparent workpiece surface mode. The metrology system includes a light source, a lens (e.g., an objective lens), a camera, one or more processors, and a memory. The lens inputs image light arising from surfaces of a workpiece which are illuminated by the light source, and transmits the image light along an imaging optical path. The camera receives imaging light transmitted along the imaging optical path and provides images of the workpiece, wherein a focus position of the system is configured to be variable over a plurality of positions within a focus range along a Z height direction proximate to the workpiece.

The memory is coupled to the one or more processors and stores program instructions that when executed by the one or more processors cause the one or more processors to perform various steps/processes such as the following. An image stack is acquired comprising a plurality of images, wherein each image of the image stack is acquired at a different corresponding Z-height within a focus range. Each image of the image stack includes a first surface that is at least one of transparent or semi-transparent and a second surface that is at least partially viewable through the first surface. A plurality of focus curves are determined based on the images of the image stack. A first local focus peak is determined from each focus curve that corresponds to the first surface and a second local focus peak is determined from each focus curve that corresponds to the second surface. A first displayed image includes a first selected surface that is selected by a user in accordance with an option for selecting either the first surface or the second surface. The first selected surface is one of: the first surface, for which the first displayed image includes the first surface and not the second surface, as based on the first local focus peaks and not the second local focus peaks; or the second surface that is at least partially viewable through the first surface, for which the first displayed image includes the second surface and not the first surface, as based on the second local focus peaks and not the first local focus peaks.

In various implementations, an option may be presented in a user interface for a user to select between the first surface and the second surface. In various implementations, the system is configured to only determine the first and second local focus peaks that correspond to the first and second surfaces, respectively, and is not configured to determine any additional local focus peaks of the focus curves such as may correspond to any additional surfaces.

In various implementations, the first displayed image and/or an additional displayed image may be a first displayed 2 dimensional (2D) extended depth of field (EDOF) image and/or a first displayed 3 dimensional (3D) image which includes the first selected surface. A 3D image may include the selected surface and may be based on the same local focus peaks that the first displayed 2D EDOF image is based on. In addition, at a different time, a user may select to have displayed a second displayed image of a second selected surface that is selected by a user in accordance with an option for selecting either the first surface or the second surface (e.g., for which the second selected surface is different than the first selected surface and is based on the different local focus peaks). The first and second displayed images may be first and second displayed 2D EDOF images and/or may be, or may be displayed with, corresponding first and second displayed 3D images.

In various implementations, a measurement may be determined between two features on the first selected surface based on operations of one or more video tools as applied to the first selected surface in the first displayed image. In various implementations, the one or more video tools may include at least one of a dimension-measuring tool, point tool, box tool, circle tool, or arc tool.

In various implementations, the first local focus peaks that correspond to the first surface may be determined based on all of the first local focus peaks sharing a same first numbered position in each of the focus curves. The second local focus peaks that correspond to the second surface may be determined based on all of the second local focus peaks sharing a same second numbered position in each of the focus curves. In various implementations, a local focus peak may be determined from a focus curve that corresponds to the second surface but which does not share the same second numbered position in the respective focus curve, wherein the local focus peak is determined based on falling within a Z filtering range that is set by a user.

In various implementations, the determining of the first and second local focus peaks that correspond to the first and second surfaces, respectively, comprises eliminating one or more local focus peaks of the focus curves that do not fulfill at least one specified quality criteria. In various implementations, at least one interpolated local focus peak may be determined for a focus curve that does not include a local focus peak corresponding to a surface based on interpolating between at least two local focus peaks of other focus curves that correspond to the surface.

In various implementations, the acquiring of the image stack comprises projecting a pattern onto the first and second surfaces which results in at least some higher local focus peaks in the focus curves than would result from the same image acquisition process and conditions but without the projected pattern. A second image stack may be acquired without utilizing the pattern projection, and for which the first local focus peaks are utilized to determine what image data from the second image stack corresponds to the first surface, wherein the first selected surface is the first surface and the image data from the second image stack that corresponds to the first surface is utilized for the displaying of the first displayed image which includes the first surface.

In various implementations, a computer-implemented method may be provided for operating the metrology system. In such implementations, the steps/processes described above may be performed under control of one or more computing systems configured with executable instructions.

DETAILED DESCRIPTION

Figure 1:
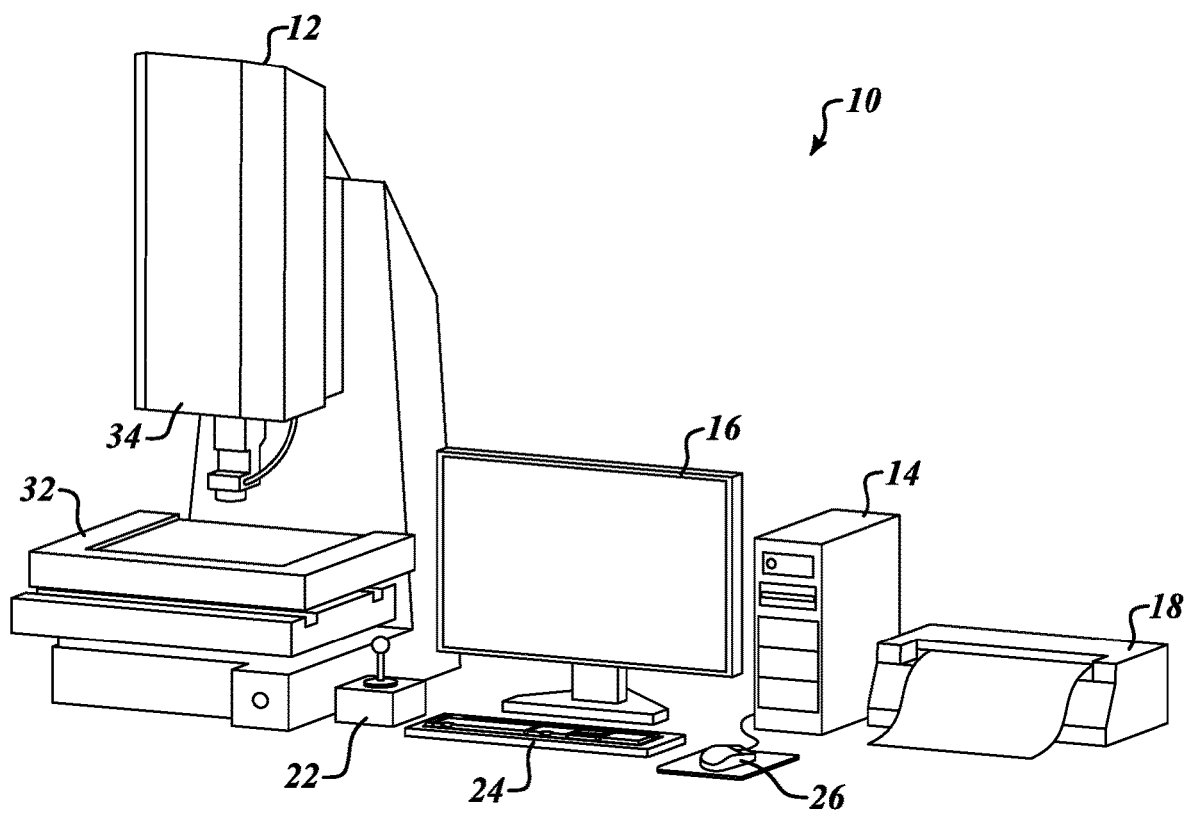
FIG. 1 is a diagram showing various typical components of a general-purpose precision machine vision metrology system.

FIG. 1 is a block diagram of one exemplary machine vision metrology system 10 usable as or including an imaging system as also described herein. The machine vision metrology system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision metrology system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of a machine vision metrology system 10 are also described in commonly assigned U.S. Pat. Nos. 7,454,053; 7,324,682; 8,111,905; and 8,111,938, each of which is hereby incorporated herein by reference in its entirety.

Figure 2:
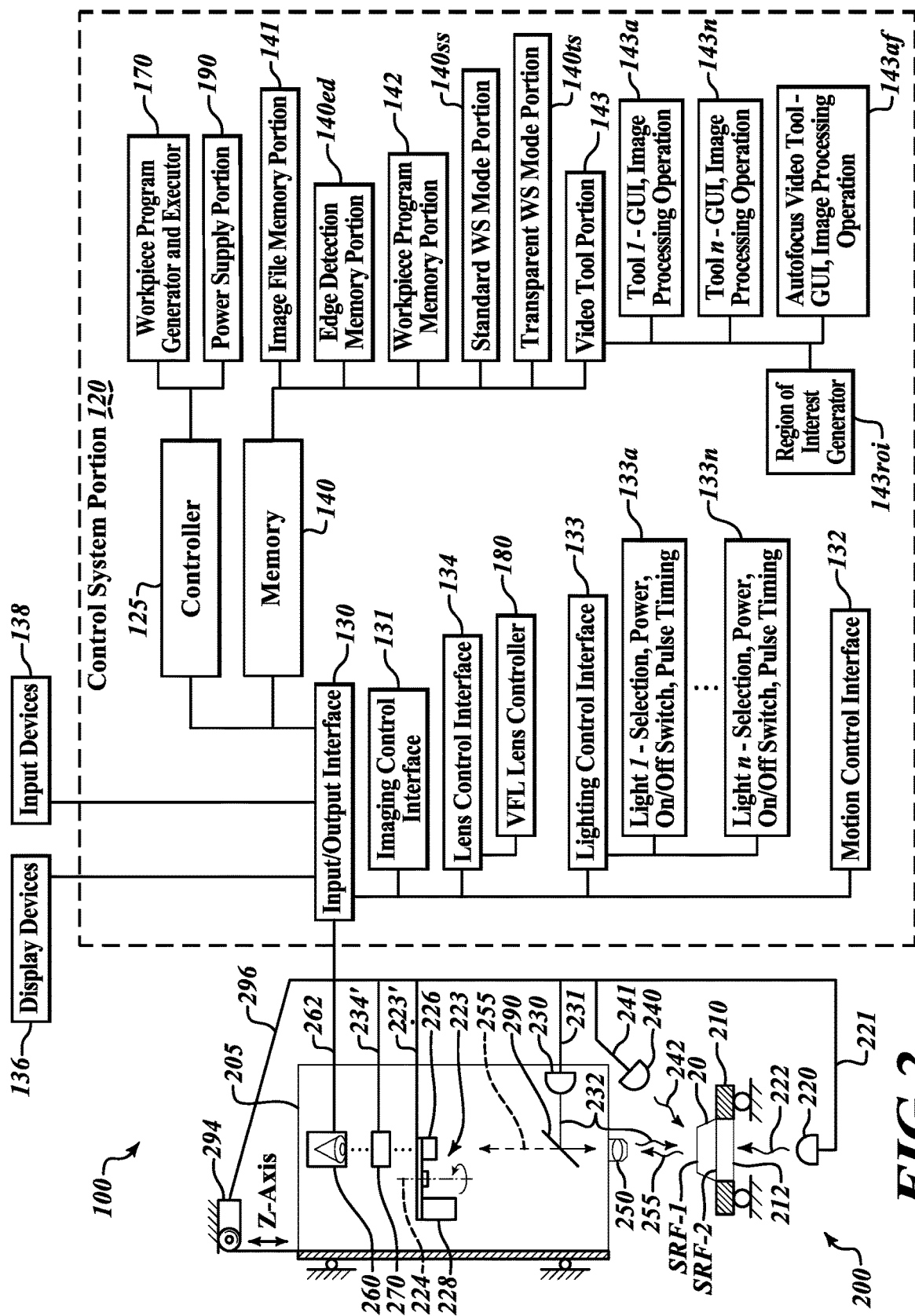
FIG. 2 is a block diagram of a control system portion and a vision components portion of a machine vision metrology system similar to that of FIG. 1 and including certain features disclosed herein.

FIG. 2 is a block diagram of a control system portion 120 and a vision components portion 200 of a machine vision metrology system 100 similar to the machine vision metrology system of FIG. 1, including certain features disclosed herein. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. The workpiece stage 210 is controllably movable along X and Y axes that lie in a plane that is generally parallel to the surface of the stage where a workpiece 20 may be positioned.

The optical assembly portion 205 includes a camera system 260, an interchangeable objective lens 250 and may include a variable focal length (VFL) lens 270 (e.g., a tunable acoustic gradient (TAG) lens in various exemplary implementations). In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis that is generally orthogonal to the X and Y axes by using a controllable motor 294 that drives an actuator to move the optical assembly portion 205 along the Z axis (e.g., an optical axis of the optical system including the optical assembly portion 205) to vary a focus position and thus change the focus of an image of a workpiece 20. The controllable motor 294 is connected to an input/output interface 130 via a signal line 296. As will be described in more detail below, to change the focus of the image over a smaller range, or as an alternative to moving the optical assembly portion 205, the VFL (e.g., TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180, as described in greater detail below. A workpiece 20 may be placed on the workpiece stage 210. The workpiece stage 210 may be controlled to move relative to the optical assembly portion 205 (e.g., moving in an XY plane), such that the field of view of the interchangeable objective lens 250 moves between locations on a workpiece 20, and/or among a plurality of workpieces 20, etc.

As will be described in more detail below, in various implementations the workpiece 20 may include an upper surface SRF-1 that is at least one of transparent or semi-transparent, and a lower surface SRF-2 that is at least partially viewable through the upper surface SRF-1. For example, in various applications the workpiece 20 may be and/or include material such as glass, a lens, thin film, etc. and/or other materials that may be transparent or semi-transparent (e.g., for which the upper surface SRF-1 may correspond to a top surface of the workpiece, and the lower surface SRF-2 may correspond to another surface, such as a bottom surface of the workpiece, or a part of a different material, portion, layer, etc. of the workpiece).

One or more of a stage light source 220, a coaxial light source 230, and a surface light source 240 (e.g., a ring light) may emit source light 222, 232, and/or 242, respectively, to illuminate a workpiece 20 or workpieces 20. For example, during an image exposure, the coaxial light source 230 may emit source light 232 along a path including a beam splitter 290 (e.g., a partial mirror). The source light 232 is reflected or transmitted as image light 255, and the image light used for imaging passes through the interchangeable objective lens 250, the turret lens assembly 223 and the VFL lens 270, and is gathered by the camera system 260. A workpiece image exposure which includes the image of the workpiece (s) 20, is captured by the camera system 260, and is output on a signal line 262 to the control system portion 120.

Various light sources (e.g., the light sources 220, 230, 240) may be connected to a lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As further shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL lens 270. In some implementations, the lens control interface 134 and the VFL lens controller 180 may be merged and/or indistinguishable.

Figure 3:
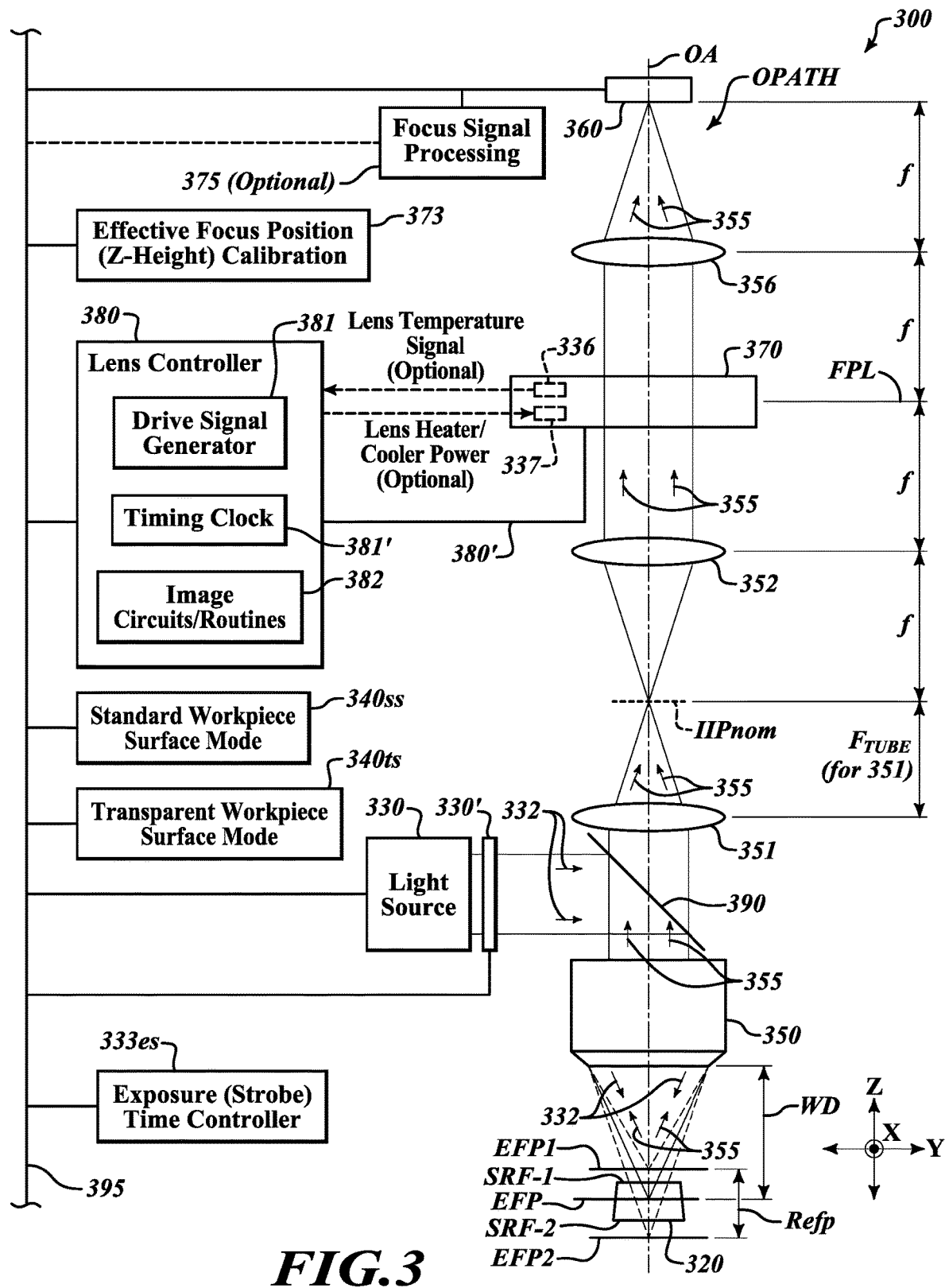
FIG. 3 is a schematic diagram of an imaging system that may be adapted to a precision non-contact metrology system such as a machine vision metrology system, and including certain features disclosed herein.

The lighting control interface 133 may include lighting control elements 133a-133n, that control, for example, the selection, power, on/off switch, and strobe pulse timing, if applicable, for the various corresponding light sources of the machine vision metrology system 100. In some implementations, an exposure (strobe) time controller 333es as shown in FIG. 3 may provide strobe timing signals to one or more of the lighting control elements 133a-133n, such that they provide an image exposure strobe timing that is synchronized with a desired phase time of the VFL lens focus position modulation (e.g., in accordance with certain stored calibration data), and as described in greater detail below. In some implementations, the exposure (strobe) time controller 333es and one or more of the lighting control elements 133a-133n may be merged and/or indistinguishable.

The memory 140 may include an image file memory portion 141, an edge-detection memory portion 140ed, a workpiece program memory portion 142 that may include one or more part programs, or the like, a standard workpiece surface (WS) mode portion 140ss, a transparent workpiece surface (WS) mode portion 140ts, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143 and/or as part of other operations. Examples of the operations of video tools for locating edge features and performing other workpiece feature inspection operations are described in more detail in certain of the previously incorporated references, as well as in the previously incorporated U.S. Pat. No. 7,627,162.

The video tool portion 143 also includes an autofocus video tool 143af that determines the GUI, image-processing operation, etc., for focus height (i.e., effective focus position (Z-height)) measurement operations. In various implementations, the autofocus video tool 143af may additionally include a high-speed focus height tool that may be utilized to measure focus heights with high speed using hardware illustrated in FIG. 3, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

In general, precision machine vision metrology systems (e.g., such as those of FIGS. 1 and 2) may be programmable to provide automated video inspection. Such systems typically include selectable modes of operation as well as GUI features and predefined image analysis video tools, such that operation and programming can be performed by "non-expert" operators. Such video tools may be used manually in "manual mode", and/or their parameters and operation can also be recorded during learn mode, in order to create part programs. In various implementations, video tools may include, for example, edge-/boundary-detection tools, autofocus tools, shape- or pattern-matching tools, dimension-measuring tools, and the like. The previously incorporated U.S. Pat. Nos. 6,542,180 and 7,627,162 teach vision systems including the use of video tools for inspection programming.

In various implementations, a standard workpiece surface mode portion 140ss may operate similarly to known methods (e.g., may be selectable as an operating mode by a user and/or as provided in the form of a video tool and/or utilized as part of certain video tools, autofocus tools, etc.) with respect to standard (e.g., non-transparent, etc.) workpiece surfaces. For example, in accordance with such previously known methods, an image stack may be acquired/captured including images of a workpiece surface, and a single focus peak may be determined for each focus curve for a region of interest, in accordance with the previously known methods (e.g., as described in the incorporated references). As will be described in more detail below, the transparent workpiece surface mode portion 140ts may operate based on certain methods as disclosed herein, and may similarly be selectable as an operating mode by a user and/or as provided in the form of a video tool and/or utilized as part of certain video tools, autofocus tools, etc.) For example, in accordance with such methods, an image stack may be acquired and more than one local focus peak (e.g., two local focus peaks) may be determined for each focus curve (e.g., for which a first local focus peak may correspond to an upper transparent or semi-transparent surface SRF-1 of the workpiece 20 and a second local focus peak may correspond to a lower surface SRF-2 of the workpiece 20 that is at least partially viewable through the upper surface SRF-1, as will be described in more detail below).

Figure 8A:
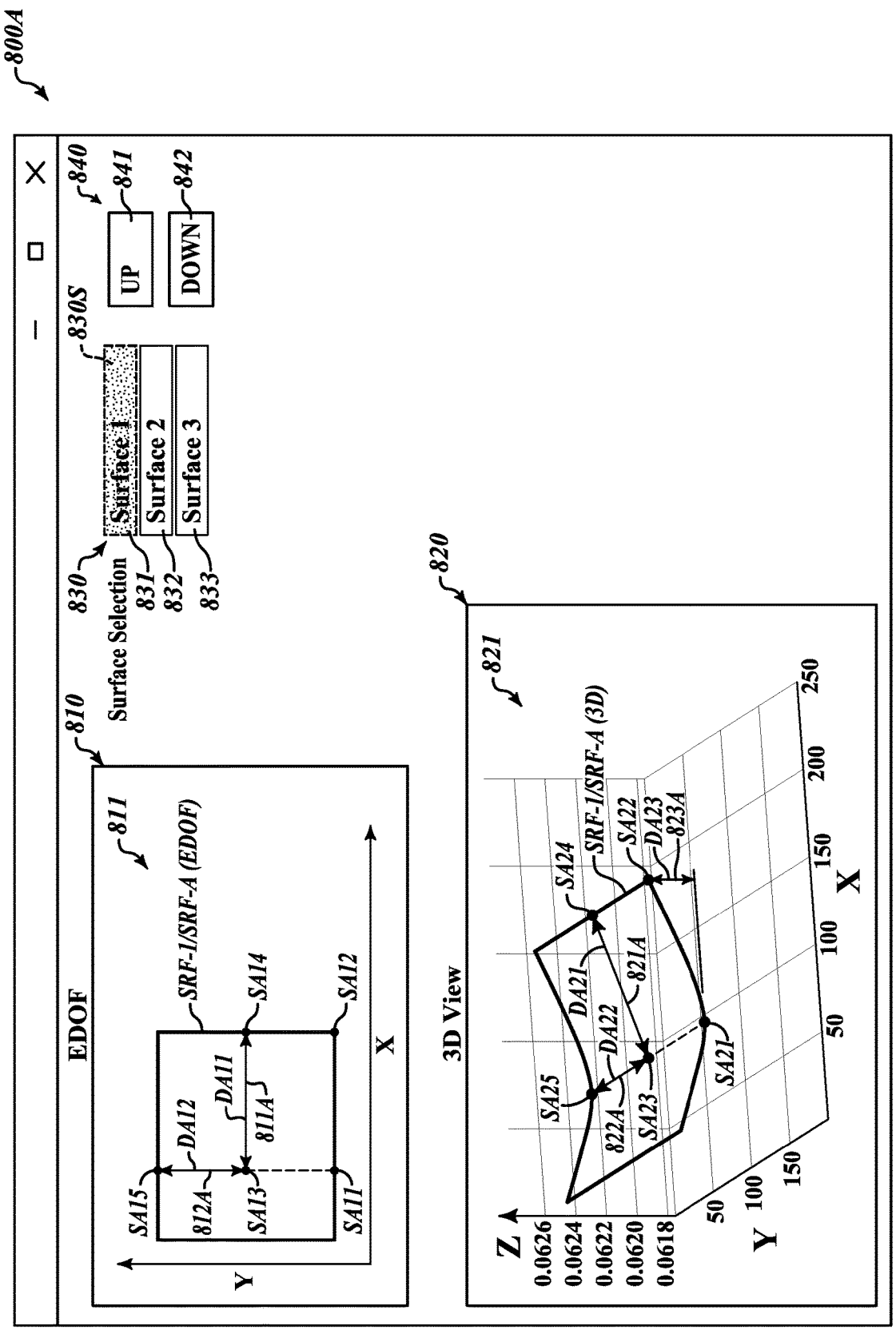
FIGS. 8A and 8B are diagrams illustrating a first exemplary implementation of a user interface for viewing 2 dimensional extended depth of field images and 3 dimensional images of workpiece surfaces such as the surfaces of FIG. 4.
Figure 8B:
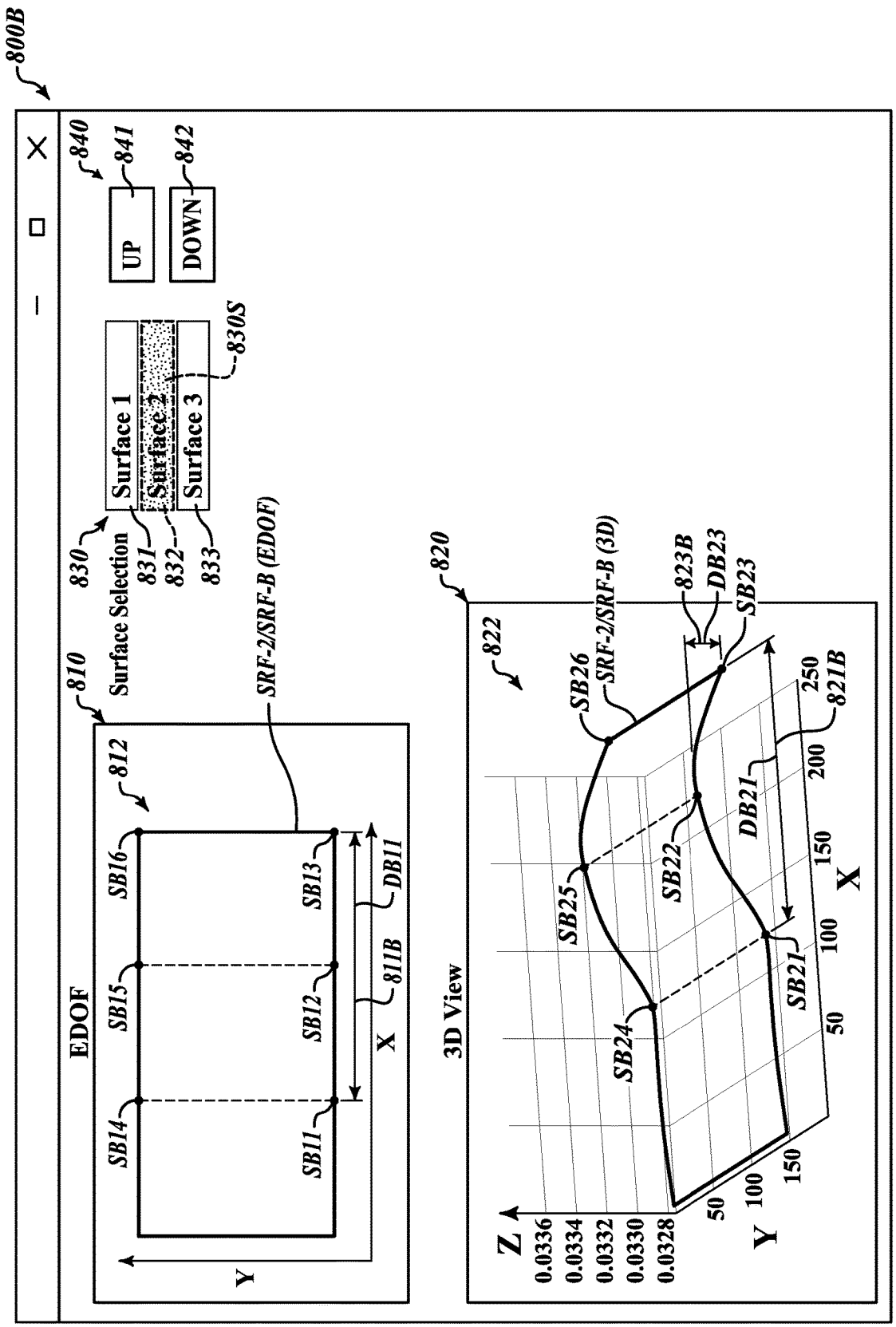
Figure 10A:
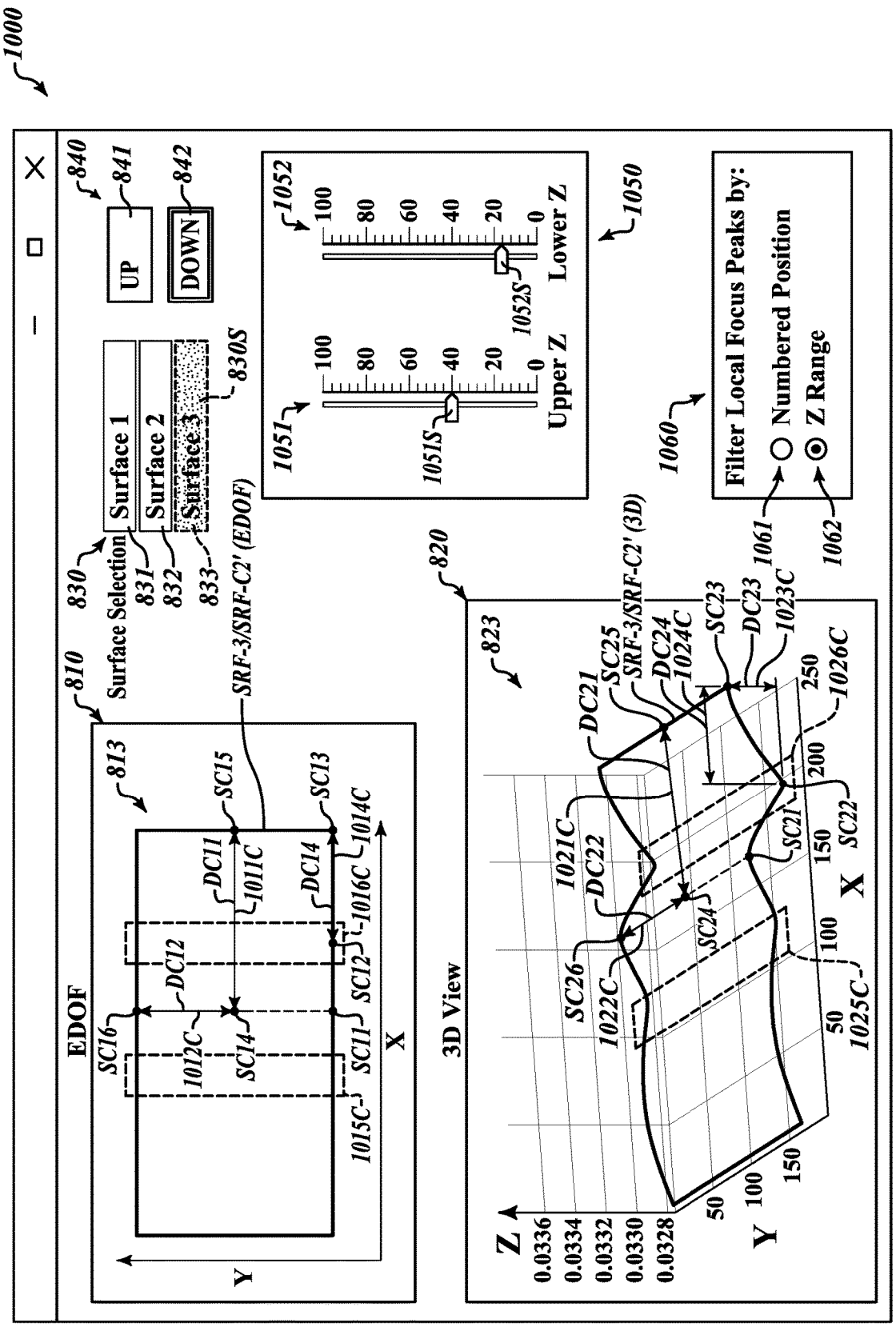
FIGS. 10A and 10B are diagrams illustrating a second exemplary implementation of a user interface for viewing 2 dimensional extended depth of field images and 3 dimensional images of workpiece surfaces such as the surfaces of FIG. 9.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface (e.g., as illustrated in FIGS. 8A, 8B and 10A) that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision metrology system 100 to create a part program for the workpiece 20, the user generates part program instructions by operating the machine vision metrology system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision metrology system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

FIG. 3 is a schematic diagram of an imaging system 300 that may be adapted to a machine vision metrology system or configured as a standalone system, and may be operated according to principles disclosed herein. It will be appreciated that certain numbered components 3XX of FIG. 3 may correspond to and/or provide similar operations or functions as similarly numbered components 2XX of FIG. 2, and may be similarly understood unless otherwise indicated.

As will be described in more detail below, an imaging optical path OPATH (also called a workpiece imaging optical path herein) comprises various optical components arranged along a path that conveys image light 355 from the workpiece 320 to the camera 360 (e.g., as part of an optical system of the imaging system 300). The image light is generally conveyed along the direction of their optical axes OA. In the implementation shown in FIG. 3, all the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes a VFL lens 370 (which may be included in a 4f imaging configuration) and is utilized at least in part for imaging a surface of a workpiece 320 during a workpiece image exposure, along an optical axis OA of the optical system.

As shown in FIG. 3, the imaging system 300 includes a light source 330, a pattern projection portion 330', an exposure (strobe) time controller 333es, a standard workpiece surface mode 340ss, a transparent workpiece surface mode 340ts, an objective lens 350, a tube lens 351, a relay lens 352, a VFL (TAG) lens 370, a relay lens 356, a lens controller 380, a camera 360, an effective focus position (Z-height) calibration portion 373, and a workpiece focus signal processing portion 375 (optional). In various implementations, the various components may be interconnected by direct connections or one or more data/control busses (e.g., a system signal and control bus 395) and/or application programming interfaces, etc.

As will be described in more detail below, in various implementations, the VFL lens controller 380 may control a drive signal of the VFL lens 370 to periodically modulate optical power of the VFL lens 370 over a range of optical powers that occur at respective phase timings within the periodic modulation. The camera 360 (e.g., including an imaging detector) receives light transmitted along an imaging optical path OPATH through the VFL lens 370 during an image exposure and provides a corresponding camera image. The objective lens 350 inputs image light arising from a workpiece 320 during an image exposure, and transmits the image light along the imaging optical path OPATH through the VFL lens 370 and to the camera 360 during the image exposure, to provide a workpiece image in a corresponding camera image. An effective focus position EFP in front of the objective lens 350 during an image exposure corresponds to the optical power of the VFL lens 370 during that image exposure. The exposure time controller 333es is configured to control an image exposure timing used for a camera image.

With respect to the general configuration shown in FIG. 3, the light source 330 may be a "coaxial" or other light source configured to emit the source light 332 (e.g., with strobed or continuous illumination) along a path including a beam splitter 390 (e.g., a partially reflecting mirror as part of a beam splitter) and through the objective lens 350 to a surface of a workpiece 320, wherein the objective lens 350 receives the image light 355 (e.g., workpiece light) that is focused at an effective focus position EFP proximate to the workpiece 320, and outputs the image light 355 to the tube lens 351. The tube lens 351 receives the image light 355 and outputs it to the relay lens 352. In other implementations, analogous light sources may illuminate the field of view in a non-coaxial manner; for example, a ring light source may illuminate the field of view.

In various implementations, the objective lens 350 may be an interchangeable objective lens, and the tube lens 351 may be included as part of a turret lens assembly (e.g., similar to the interchangeable objective lens 250 and the turret lens assembly 223 of FIG. 2). In the implementation shown in FIG. 3, image light 355 arising from a nominal focal plane of the objective lens 350 is focused by the tube lens 351 to form an intermediate image at a nominal intermediate image plane IIPnom. When the VFL (TAG) lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the VFL (TAG) lens 370. The VFL (TAG) lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the light source 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the VFL (TAG) lens 370 (e.g., which may be a low numerical aperture (NA) device) at the Fourier plane of the objective lens 350. This configuration may maintain the telecentricity at the workpiece 320, and may minimize scale change and image distortion (e.g., including providing constant magnification for each effective focus position (Z-height) of the workpiece 320). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380'. In various implementations, the imaging system 300 may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing of the VFL lens 370, as well as controlling, monitoring and adjusting the driving and response of the VFL lens 370. In various implementations, the image circuits/routines 382 perform imaging operations for the optical system (e.g., as may be synchronized with the phase timing of the VFL lens 370).

In various instances, drift in the operating characteristics of the VFL lens may arise due to unwanted temperature variations. As shown in FIG. 3, in various implementations, the imaging system 300 may optionally include the lens heater/cooler 337 associated with the VFL lens 370. The lens heater/cooler 337 may be configured to input an amount of heat energy into the VFL lens 370 and/or perform cooling functions to facilitate heating and/or cooling of the VFL lens 370 according to some implementations and/or operating conditions. In addition, in various implementations, a VFL lens monitoring signal may be provided by a temperature sensor 336 associated with the VFL lens 370 to monitor an operating temperature of the VFL lens 370.

With respect to the general operations of the VFL lens 370, in various implementations as described above, the lens controller 380 may rapidly adjust or modulate the optical power of the VFL lens 370 periodically, to achieve a high-speed VFL lens capable of a periodic modulation (i.e., at a VFL lens resonant frequency) such as 250 kHz, or 70 kHz, or 30 kHz, or the like. As shown in FIG. 3, by using the periodic modulation of a signal to drive the VFL lens 370, the effective focus position EFP of the imaging system 300 (that is, the focus position in front of the objective lens 350) may be rapidly moved within a range Refp (e.g., an autofocus search range or focus range, etc.) bound by an effective focus position EFP1 (or EFPmax) corresponding to a maximum optical power of the VFL lens 370 in combination with the objective lens 350, and an effective focus position EFP2 (or EFPmin) corresponding to a maximum negative optical power of the VFL lens 370 in combination with the objective lens 350. In various implementations, the effective focus positions EFP1 and EFP2 may approximately correspond to phase timings of 90 degrees and 270 degrees. In various implementations, the middle of the range Refp may be designated as EFPnom, and may correspond to zero optical power of the VFL lens 370 in combination with the nominal optical power of the objective lens 350. According to this description, EFPnom may approximately correspond to the nominal focal length of the objective lens 350 in some implementations (e.g., which may correspond to a working distance WD of the objective lens 350).

In various implementations, the modulation of the VFL lens 370 may be utilized to acquire an image stack, such as described in U.S. Pat. Nos. 9,143,674 and 9,830,694, each of which is hereby incorporated herein in its entirety. As described in the incorporated references, a periodically modulated Z height of the focus position of the imaging system of FIG. 3 may be controlled by periodically modulating the focal length of a VFL lens in the imaging system (e.g., the TAG lens 370), as outlined above. In various implementations, strobed illumination (e.g., from the light source 330 as controlled by the exposure time controller 333es) can be timed to correspond with a respective phase timing of the periodically modulated focus position to expose an image focused at a respective Z height. That is, while a digital camera (e.g., camera 360) is acquiring an image during an integration period, if a short strobe pulse is provided at a phase timing $\phi 0$, then the focus position will be at a height 40, and any workpiece surface that is located at the height 40 will be in focus in the resulting image. Similar principles are applied for other exemplary phase timings and Z heights throughout the focus range.

In various implementations, such processes may be utilized for obtaining an image stack. For example, as the TAG lens and corresponding overall focus position of the system is modulated sinusoidally, different images of the workpiece surface are captured as corresponding to different phase timings and different corresponding Z-heights. As a simplified example, if a focus range is 100 mm and images are captured in 1 mm steps, the image stack may include 100 images, with each captured image corresponding to a different Z-height in 1 mm steps throughout the 100 mm focus range. In various implementations, an image stack may also be acquired in a system with or without a VFL lens (e.g., by utilizing the controllable motor 294 that drives an actuator to move the optical assembly portion 205 along the Z axis to change the focus position of the imaging system relative to the workpiece 20/320 for obtaining the different images of an image stack at different effective focus positions, and so that each image of the image stack will be acquired at a different corresponding known Z-height within a focus range in accordance with the control of the motor 294). U.S. Pat. No. 8,581,162 describes various techniques for the acquisition and utilization of image stacks, and is hereby incorporated herein by reference in its entirety.

In one implementation, the optional focus signal processing portion 375 may input data from the camera 360 and may provide data or signals that are utilized to determine when an imaged surface region (e.g., of a workpiece 320) is at an effective focus position. For example, a group of images acquired by the camera 360 at different effective focus positions (Z-heights), such as part of an image stack, may be analyzed using a known "maximum contrast" or "best-focus image" analysis to determine when an imaged surface region of a workpiece 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (sweeping of multiple effective focus positions) of the imaging system (e.g., utilizing the VFL lens 370 or motor 294, etc.), and determine an image and/or image timing at which a target feature (e.g., of a workpiece) is best-focused.

In some implementations, the focus signal processing portion 375 may determine a phase timing of the VFL lens 370 corresponding to a best-focus (e.g., of a workpiece feature) and output that "best-focus" phase timing value to the effective focus position calibration portion 373. The effective focus position calibration portion 373 may provide effective focus position (Z-height) calibration data that relates respective effective focus positions (Z-heights) to respective "best-focus" phase timings within a period of a standard imaging resonant frequency of the VFL lens 370, wherein in some instances the calibration data may generally correspond to operating the VFL lens 370 according to a standard imaging drive control configuration or reference state. For example, in various implementations, the signal data from the camera 360 may correspond to one or more images acquired by the camera (e.g., as part of an image stack), wherein contrast or other focus metric determinations as part of points-from-focus operations or other analysis may be performed to determine when an imaged surface region of the workpiece 320 is at a "best-focus" position. Exemplary techniques for the determination and analysis of image stacks and focus curves, and for points-from-focus operations, are taught in the previously incorporated U.S. Pat. Nos. 6,542,180; 8,581,162 and 9,060,117.

Generally speaking, the effective focus position calibration portion 373 comprises recorded effective focus position (Z-height) calibration data (e.g., as determined by calibration processes such as those disclosed in the incorporated references). As such, its representation in FIG. 3 as a separate element is intended to be a schematic representation only, and not limiting. In various implementations, the associated recorded effective focus position (Z-height) calibration data may be merged with and/or indistinguishable from the lens controller 380, the workpiece focus signal processing portion 375, or a host computer system connected to the system signal and control bus 395, etc.

In various implementations, the exposure (strobe) time controller 333*es* controls an image exposure time of the imaging system 300 (e.g., relative to a phase timing of the periodically modulated effective focus position). More specifically, in some implementations, during an image exposure, the exposure (strobe) time controller 333*es* (e.g., using the effective focus position (Z-height) calibration data available in the effective focus position calibration portion 373), may control the light source 330 to strobe at a respective controlled time (e.g., so that each image of an image stack will be acquired at a different corresponding known Z-height within a focus range). For example, the exposure (strobe) time controller 333*es* may control the strobe light source to strobe at a respective phase timing within a period of a standard imaging resonant frequency of the VFL lens 370, so as to acquire an image having a particular effective focus position (e.g., with a corresponding known Z-height) within the sweeping (periodic modulation) range of the VFL lens 370. In other implementations, the exposure time controller 333*es* may control a fast electronic camera shutter of the camera 360 to acquire an image at a respective controlled time and/or its associated effective focus position (Z-height). In some implementations, the exposure (strobe) time controller 333*es* may be merged with or indistinguishable from the camera 360. It will be appreciated that the operations of the exposure time controller 333*es* and other features and elements outlined above may be implemented to govern workpiece image acquisitions.

In various implementations, the standard workpiece surface mode 340*ss* or the transparent workpiece surface mode 340*ts* (e.g., implemented as separate modes and/or as video tools or parts of video tools or other portions of the system, etc.) may be selectable (e.g., by a user) depending on the characteristics of a workpiece that is being inspected. For example, when the workpiece 320 has an upper surface SRF-1 with certain characteristics (e.g., non-transparent, etc.), the standard workpiece surface mode 340*ss* may be selected and utilized. In accordance with such standard operations, in various implementations an image stack may be acquired and standard points from focus or other analysis operations may be performed, including determining a single focus peak for each determined focus curve for each region of interest (e.g., as indicating the effective focus position EFP of each region of interest on the surface SRF-1).

Alternatively, when the workpiece 320 has an upper surface SRF-1 that is transparent or semi-transparent (i.e., such that the lower surface SRF-2 can be at least partially viewed through the upper surface SRF-1), the transparent workpiece surface mode 340*ts* may be selected and utilized. As will be described in more detail below with respect to FIGS. 4-10B, as part of the transparent workpiece surface mode 340*ts*, in various implementations an image stack may be acquired and operations may be performed, including determining first and second local focus peaks for each determined focus curve for each region of interest (e.g., as indicating effective focus positions EFP of each region of interest on each of the surfaces SRF-1 and SRF-2). In various implementations, the pattern projection portion 330' may be utilized in combination with or as part of the transparent workpiece surface mode 340*ts*, as will be described in more detail below with respect to FIG. 5.

It will be appreciated that the representations in FIGS. 2 and 3 of the standard workpiece surface mode portion 140*ss*, the transparent workpiece surface mode portion 140*ts*, the standard workpiece surface mode 340*ss*, and the transparent workpiece surface mode 340*ts* as separate elements is intended to be a schematic representation only, and not limiting. In various implementations, the associated portions and modes may be separate portions, or may be part of and/or merged with and/or indistinguishable from various other portions of the systems, such as one or more video tools of the video tools portion 143, or the image circuits/ routines portion 382, or a host computer system connected to the system signal and control bus 395, etc.

Figure 4:
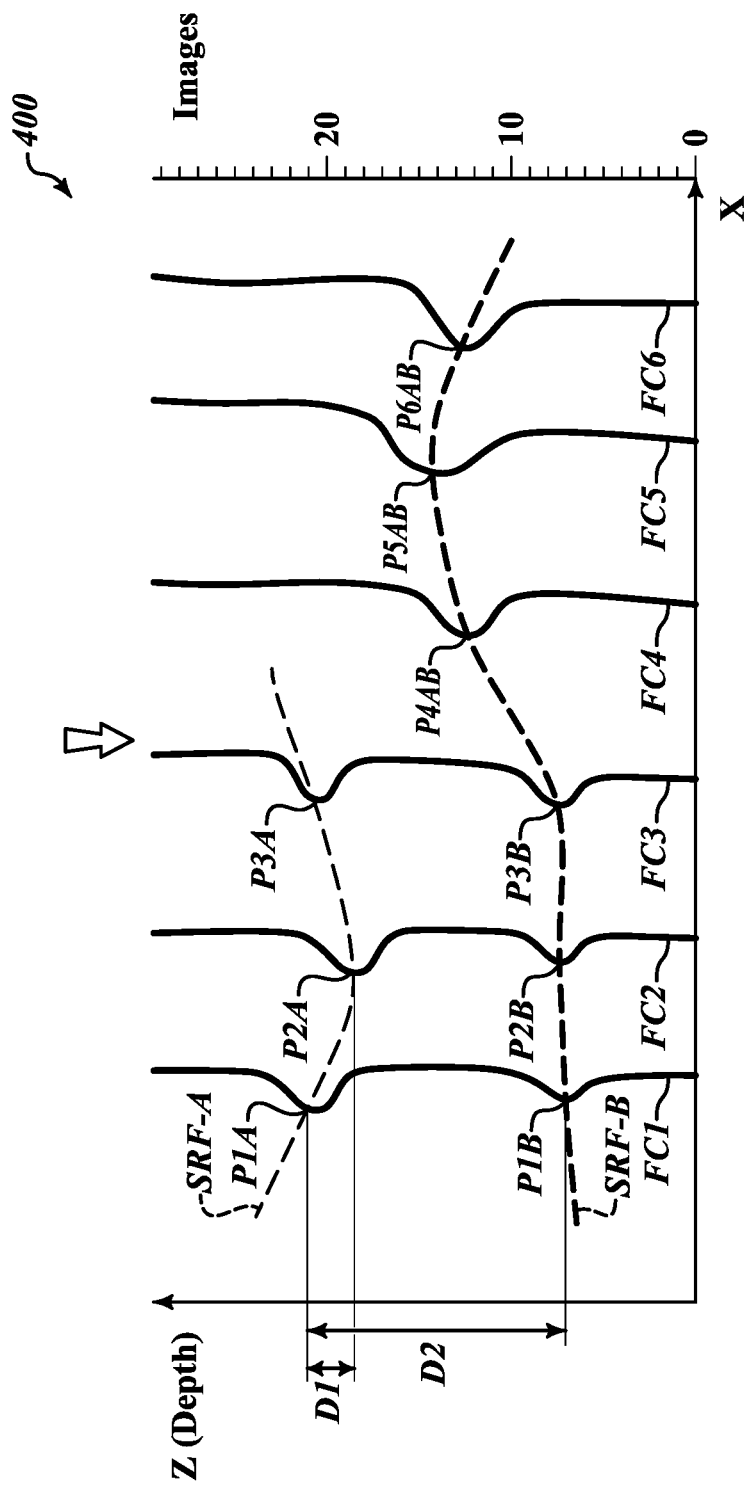
FIG. 4 is a diagram illustrating a first set of focus curves with local focus peaks corresponding to surfaces including an upper transparent or semi-transparent surface and a lower surface that is at least partially viewable through the upper surface.

FIG. 4 is a diagram illustrating a first set 400 of focus curves FC1-FC6 with local focus peaks corresponding to workpiece surfaces including an upper transparent or semi-transparent surface SRF-A and a lower surface SRF-B that is at least partially viewable through the upper surface. The numbered focus curves are illustrated as being arranged along an x-axis direction and as indicating focus metric values in accordance with the shapes of the curves along the x-axis direction, and with Z-height (e.g., depth) locations illustrated along a z-axis direction. In general, as described in the incorporated references, focus curves are typically plotted with a Z-height location along one axis (e.g., the z-axis in the illustration of FIG. 4) and a focus metric value along a second axis (e.g., the x-axis in the illustration of FIG. 4). As shown in FIG. 4, the sequentially numbered example focus curves FC1-FC6 are illustrated in order along the x-axis direction (e.g., as illustrative of the x-axis location of a region of interest on the workpiece surfaces that the respective focus curve corresponds to).

In general, as described in the incorporated references, various techniques have typically been utilized for determining focus curves. Exemplary prior techniques for the determination and analysis of image stacks and focus curves, and for points-from-focus operations, are taught in the previously incorporated U.S. Pat. Nos. 6,542,180; 8,581, 162 and 9,060,117. As described in the incorporated references, for points-from-focus and other techniques, a focus position may move through a range of Z height positions Z(i) along a z-axis (the focusing axis) and the system including a camera (e.g., camera 360) may capture an image(i) at each position. With respect to the example of FIG. 4, it will be appreciated that while the scale at the right indicates approximately 30 images being acquired, this is provided for purposes of illustration only and in various implementations a lower or higher number of images (e.g., 100 or more) may be utilized.

In general, for each captured image(i), a focus metric fm(k,i) may be calculated based on a region or sub-region of interest ROI(k) (e.g., a set of pixels) in the image and related to the corresponding position Z(i) of the camera along the Z axis at the time that the image was captured. This results in focus curve data (e.g., focus metrics fm(k,i) at positions Z(i), which is one type of focus peak determining data set), which may be referred to simply as a "focus curve" or "autofocus curve". In various implementations, the focus metric values may involve a calculation of the contrast or sharpness of the region of interest in the image. With respect to such focus curves, conventional points from focus and similar operations have typically been configured for determining only a single peak of a focus curve, which is designated as corresponding to the best focus position along the Z axis, and corresponding to the Z height for the region of interest used to determine the focus curve.

It will be appreciated that such currently known conventional algorithms (e.g., for points from focus and similar determinations, etc.) operate under a set of assumptions including that only a single focus maximum per region of interest (i.e., image location) should exist and be determined for each z scan (i.e., image stack capture). As described in the previously incorporated U.S. Pat. Nos. 8,581,162 and 9,060,117 patents, in some implementations the determination of the focus maximum may include certain relatively complex processes (e.g., due to noisy signals, etc. that may be inherent in certain determinations of focus curves), for which previous standard processes have not been directed to the determination of more than one focus maximum (i.e., focus peak) per focus curve. It will be appreciated that in some instances, in accordance with principles disclosed herein, the determination of two local focus maximums per focus curve may also involve and may potentially increase such complexities. In various implementations, due in part to the increasing complexities for such determinations (e.g., for which the determinations of additional focus maximums may further increase the complexities), it may be desirable for the system to only determine up to two local focus peaks for each focus curve (e.g., as may be a common application for certain types of workpieces with primarily first and second surfaces, such as certain workpieces comprising glass, lenses, thin films, etc.) In such implementations, the system may not be configured to determine additional local focus peaks of the focus curves (e.g., such as may correspond to additional surfaces that may be at least partially viewable through the first surface). As used herein, the term "local focus peak" may be in reference to a local maximum of a focus curve. In accordance with a standard definition, a local maximum may be a value of a function at a certain point in its domain, which is greater than or equal to the values at all other points in the immediate vicinity of the point. In various implementations, the "granularity" or sensitivity of the local maximum may be adjusted by extending or reducing the distance defined as "immediate vicinity" in the preceding definition.

In the example of FIG. 4, the focus curves FC4-FC6 each include a single focus maximum (i.e., corresponding to a single surface) for which previously known PFF and other algorithms may operate accurately (e.g., as part of a standard workpiece surface mode 140ss/340ss) for determining the single focus maximum for each focus curve and corresponding surface location along the z-axis direction. However, if such previously known algorithms/techniques are applied to the focus curves FC1-FC3, in accordance with the conventional operations, only a single focus peak would be determined (e.g., as corresponding to a global maxima of a focus curve, which according to a standard definition may be a largest value that a mathematical function has over its entire curve (domain)). In regard to the example of FIG. 4, such techniques would identify a global maxima for each of the focus curves FC1-FC3 (e.g., as corresponding to whichever surface SRF-A or SRF-B produced a larger local focus peak) and for which the smaller local focus peak (e.g., as corresponding to the other surface) would be ignored/filtered (e.g., as part of the typical global maxima filtering of such processes). Thus, if the previously known techniques were applied to the focus curves FC1-FC3, only the location of the surface SRF-A or the surface SRF-B would be determined. As will be described in more detail below, by allowing for the determination of more than one focus peak (e.g., for determining two most significant local focus peaks) as part of a different mode (e.g., as part of a transparent workpiece surface mode 140ts/340ts), the inspection and measurement of different types of workpieces may be accommodated (e.g., for more accurately imaging/measuring, etc. workpieces with transparent upper surfaces and lower surfaces that are at least partially viewable through the upper surfaces, etc.)

As illustrated in FIG. 4, in accordance with techniques as disclosed herein, local focus peaks P1A-P3A, P1B-P3B and P4AB-P6AB may be determined. In the illustrated example, the local focus peaks P1A-P3A are determined to correspond to a first surface SRF-A (e.g., an upper transparent or semi-transparent surface) and the local focus peaks P1B-P3B are determined to correspond to a second surface SRF-B (e.g., a lower surface that is at least partially visible/viewable through the upper surface SRF-A). In various implementations, the local focus peaks P4AB-P6AB may initially be designated or otherwise regarded as ambiguous as corresponding to either the surface SRF-A or the surface SRF-B. As will be described in more detail below, various techniques may be utilized for determining whether the local focus peaks P4AB-P6AB correspond to the surface SRF-A or the surface SRF-B. In one implementation, the local focus peaks P4AB-P6AB are determined as corresponding to the surface SRF-B. As will be described in more detail below with respect to the example of FIGS. 9 and 10A, in various implementations certain focus curves may not have a local focus peak that corresponds to a surface and/or may have no local focus peaks, for which such results may in some instances be correspondingly marked in a 2D EDOF image (e.g., indicating no data, with a specified color, pattern, other indicator, etc.), and may also be marked in a 3D image (e.g., marked as not a number NaN, or otherwise for indicating an undefined or unrepresentable value in the 3D image).

As will also be described in more detail below, during a portion of the surface analysis process, the surfaces SRF-A and SRF-B of FIG. 4 may initially be designated as candidate surfaces (e.g., and for which there could also be a third candidate surface that includes the local focus peaks P1A-P3A and P4AB-P6AB, due to the ambiguity of the local focus peaks P4AB-P6AB as being part of either a first or second surface). Once the candidate surfaces are evaluated, a first candidate surface (e.g., candidate surface SRF-A) may be designated as a first surface SRF-1 to be displayed, and a second candidate surface (e.g., candidate surface SRF-B) may be designated as a second surface SRF-2 to be displayed (e.g., as will be described in more detail below with respect to FIGS. 8A, 8B, 10A and 10B).

In various implementations, the first local focus peaks that correspond to a first surface SRF-1 to be displayed (e.g., as may correspond to the candidate surface SRF-A) may be determined based on all of the first local focus peaks (e.g., local focus peaks P1A, P2A and P3A) sharing a same first numbered position (e.g., a first local focus peak that is significant or "strong" enough, i.e., exceeds a predefined peak significance metric) in each of the focus curves FC1, FC2 and FC3. In various implementations, a peak significance metric may include factors such as prominence of the peak, distance from other peaks, etc. In general, a robust method of computing local peaks may be utilized as an initial step for identifying local focus peaks of focus curves.

In addition to the first local focus peaks, the second local focus peaks that correspond to a second surface SRF-2 to be displayed (e.g., as may correspond to the candidate surface SRF-B) may similarly be determined based on all of the second local focus peaks (e.g., local focus peaks P1B, P2B and P3B) sharing a same second numbered position (e.g., a second significant local focus peak) in each of the focus curves FC1, FC2 and FC3. In various implementations, the local focus peaks P4AB, P5AB and P6AB may also initially be included for consideration for the first surface SRF-1 to be displayed (e.g., as may correspond to the candidate surface SRF-A), based on being the first and only local focus peaks of the focus curves FC4, FC5 and FC6. Additional techniques may be utilized to filter the local focus peaks P4AB, P5AB and P6AB from the local focus peaks utilized/designated for the surface SRF-1/SRF-A (e.g., as not fulfilling a specified quality or strength criteria, or not falling within a Z filtering range as set by a user for the designated surface, or based on smoothness constraints or error metric minimization, etc.)

As another example, the local focus peaks that correspond to the surface SRF-2 to be displayed (e.g., as may correspond to the candidate surface SRF-B) may be determined based on all of the local focus peaks (e.g., local focus peaks P1B, P2B, P3B, P4AB, P5AB and P6AB) sharing a same numbered position in each of the focus curves. For example, the local focus peaks may also or alternatively be counted/numbered from the bottom to the top, for which the local focus peaks P1B, P2B, P3B, P4AB, P5AB and P6AB would each be a first counted/numbered local focus peak in such an order, as would correspond to the lower surface SRF-2 of the workpiece to be displayed (e.g., as may correspond to the candidate surface SRF-B). In such an implementation with such a counting order, the local focus peaks P1A, P2A and P3A would then be second counted/numbered local focus peaks for each of the focus curves FC1, FC2 and FC3 (i.e., each local focus peak having a same numbered position), as corresponding to the surface SRF-1 to be displayed (e.g., as may correspond to the candidate surface SRF-A). In various implementations, the process may include numbering/counting the local focus peaks in multiple orders (e.g., in a first iteration from top to bottom, and in a second iteration from bottom to top) for which the results may be compared and/or otherwise utilized for making the best/preferred/most consistent determination of the local focus peaks that correspond to the surfaces (e.g., upper and lower) of the workpiece.

It will be appreciated that the example of FIG. 4 is illustrated with respect to 2 dimensional data, and represents a cross-sectional "slice" of a workpiece (e.g., in accordance with the corresponding regions of interest as centered or otherwise located at a particular y-axis location along the workpiece surfaces). More specifically, as noted above, the x-axis locations of each of the focus curves FC1-FC6 may generally be representative of x-axis locations of a region of interest on the workpiece surfaces that the respective focus curve corresponds to. The z-axis location of each of the local focus peaks P1A-P3A, P1B-P3B and P4AB-P6AB may generally be representative of a Z-height of a best-focused region of interest on the workpiece surfaces that the respective focus curve corresponds to. These values may be considered as being representative of 2 dimensional data (e.g., an XZ slice) of each of the surfaces, and by further utilizing similar processes for determining such focus curves and corresponding local focus peaks for regions of interest at other y-axis locations along the surfaces (e.g., as corresponding to the y-axis locations of other regions of interest), representative 3 dimensional data for each of the workpiece surfaces (e.g., surfaces SRF-A and SRF-B) may be determined.

As will be described in more detail below with respect to FIGS. 8A and 8B, as a simplified example, if in one implementation the Z-heights of the surfaces are approximately similar along a y-axis (e.g., having constant Z-heights along the y-axis direction or with a constant slope), the examples of FIGS. 8A and 8B may be representative of surfaces including the 2 dimensional data of FIG. 4. More specifically, as noted above, 3 dimensional data may be determined for additional y-axis locations along a given y-axis dimension for the surfaces. It will be appreciated that such examples are provided for purposes of illustration only, and that various workpiece surfaces may have more complex 3 dimensional data (e.g., with Z-height variations across both the x and y-axis directions).

Figure 5:
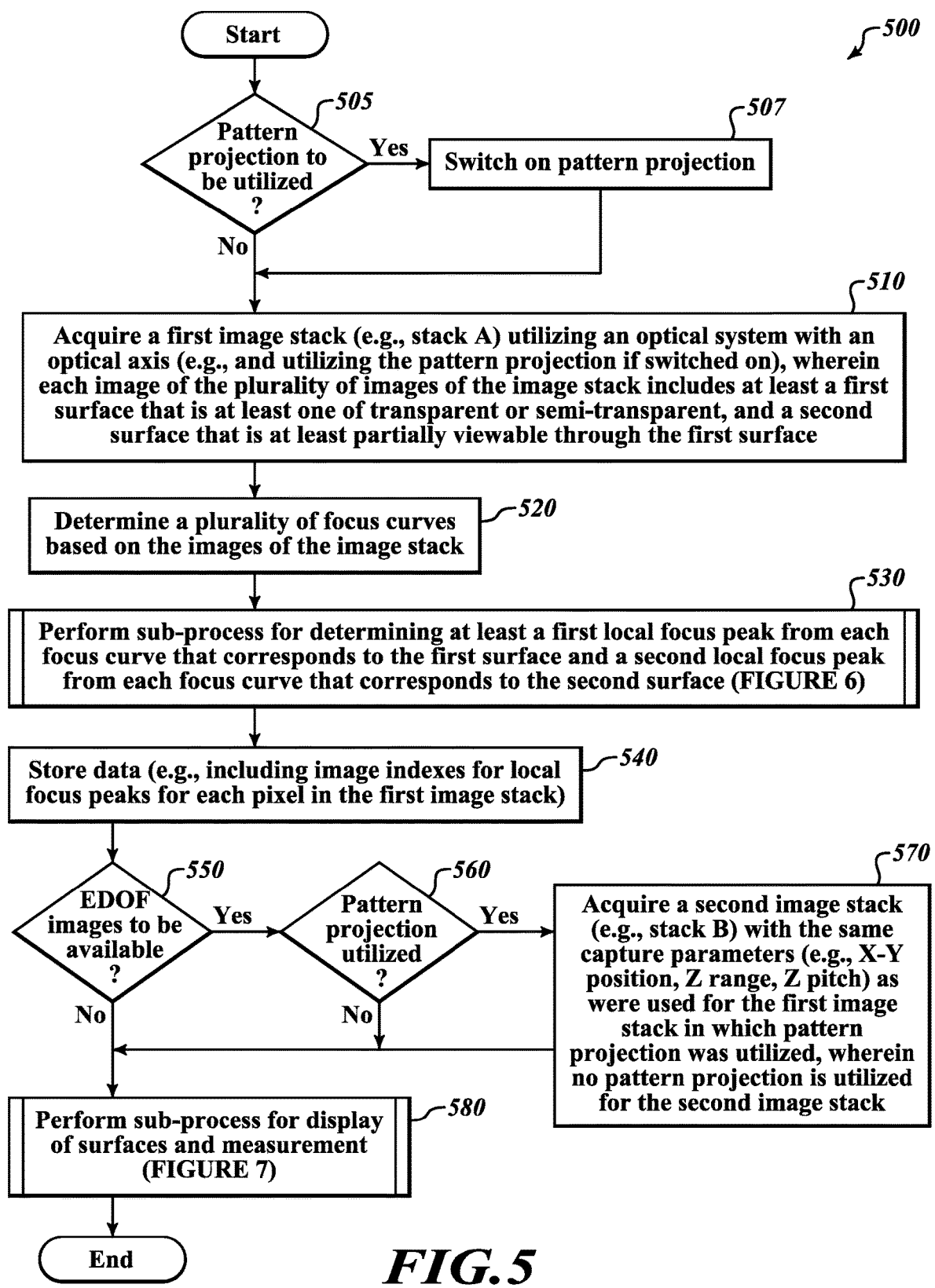
FIG. 5 is a flow diagram illustrating an exemplary process for displaying an image of a selected surface and performing measurements.
Figure 6:
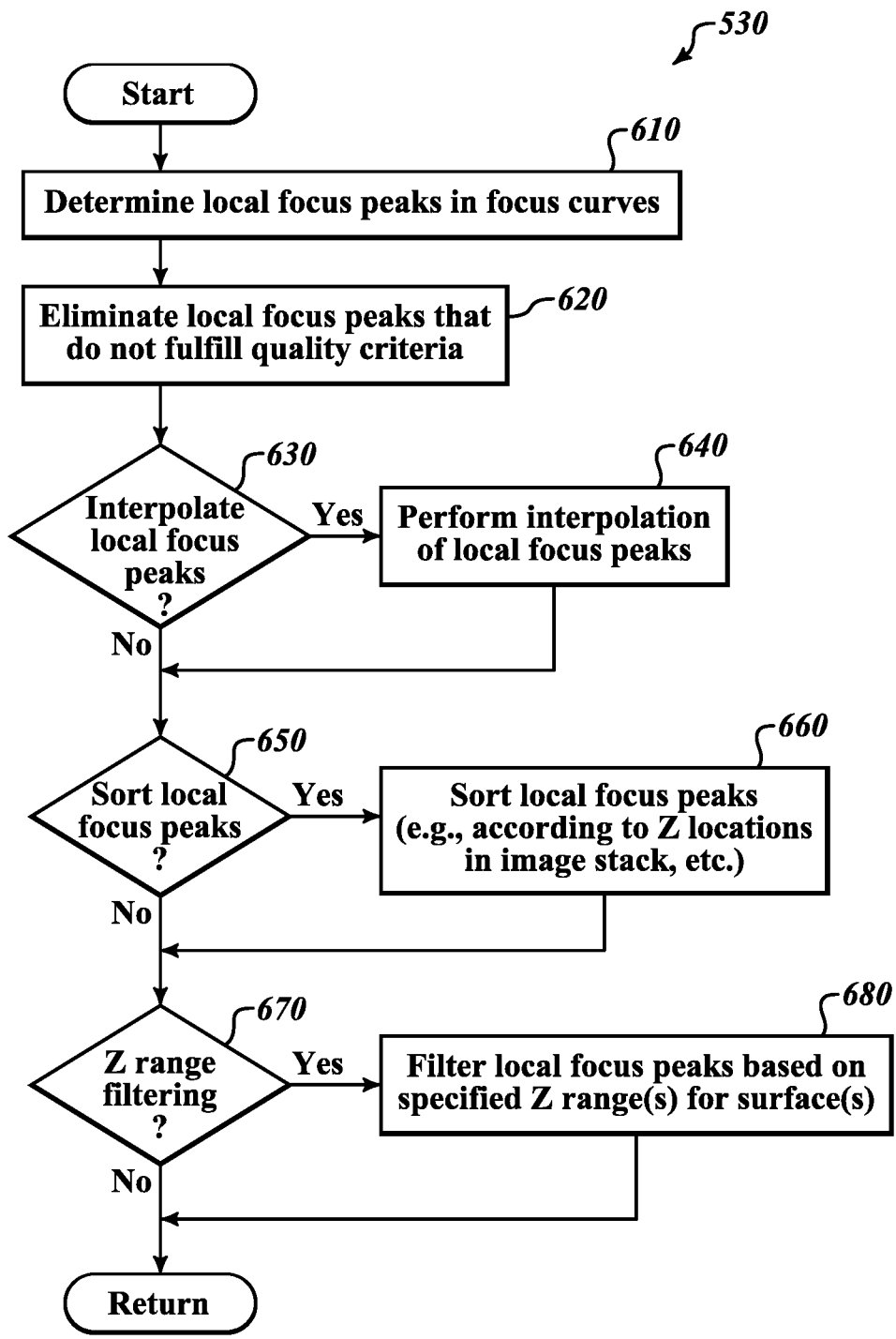
FIG. 6 is a flow diagram illustrating an exemplary sub-process for determining local focus peaks of focus curves that correspond to surfaces.
Figure 7:
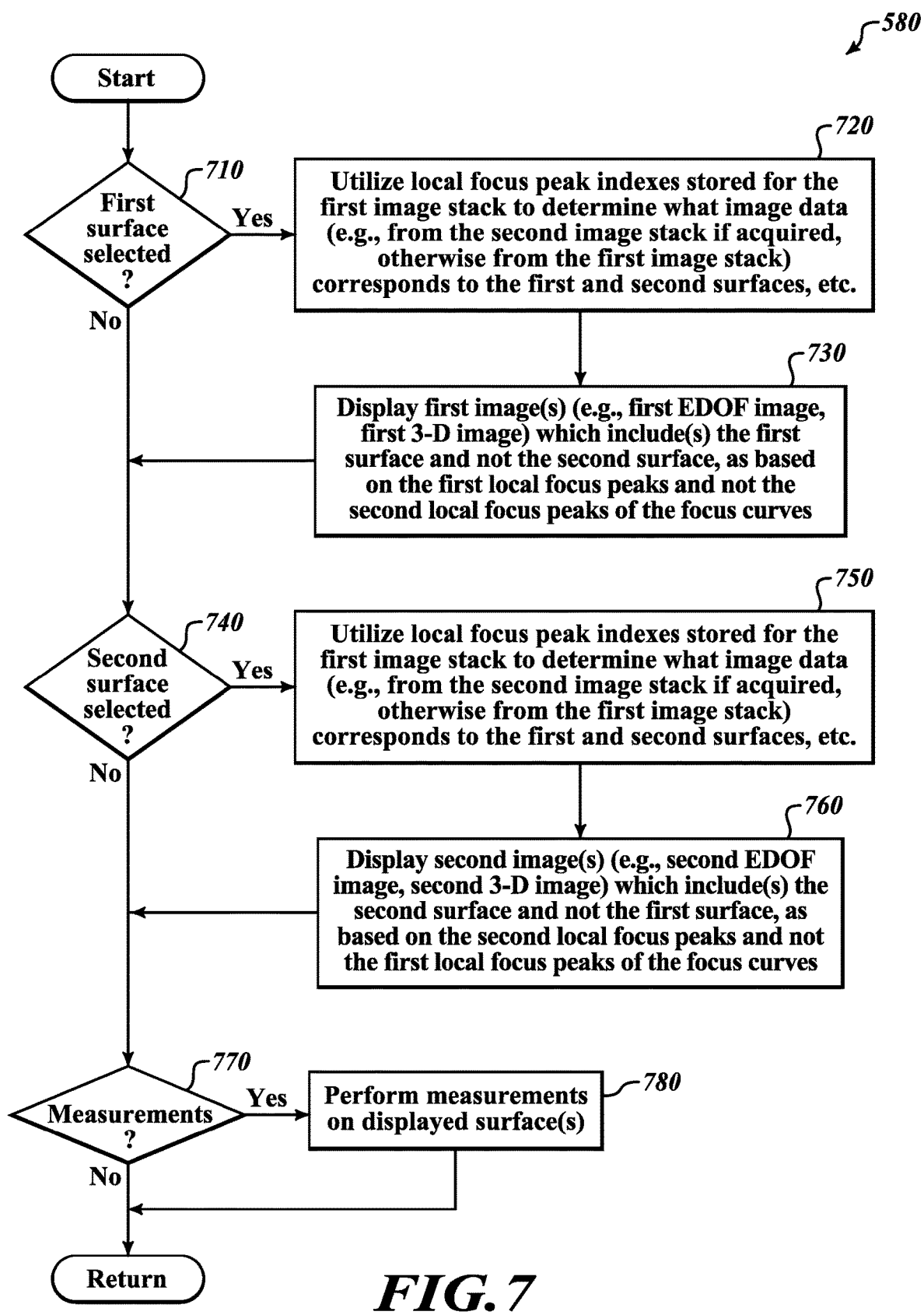
FIG. 7 is a flow diagram illustrating an exemplary sub-process for utilizing pattern projection.
Figure 9:
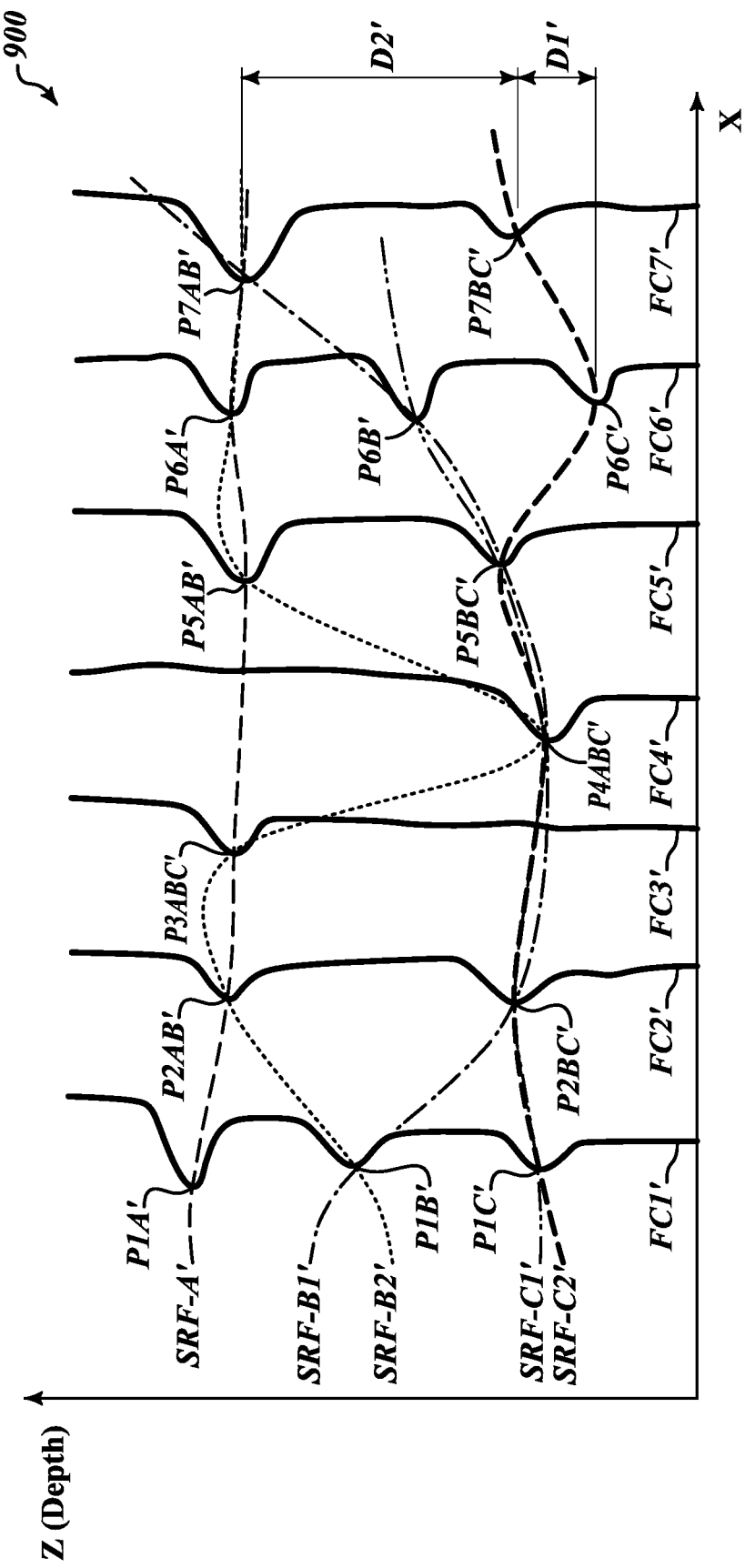
FIG. 9 is a diagram illustrating a second set of focus curves with local focus peaks corresponding to surfaces including at least an upper transparent or semi-transparent surface and a lower surface that is at least partially viewable through the upper surface.
Figure 10B:
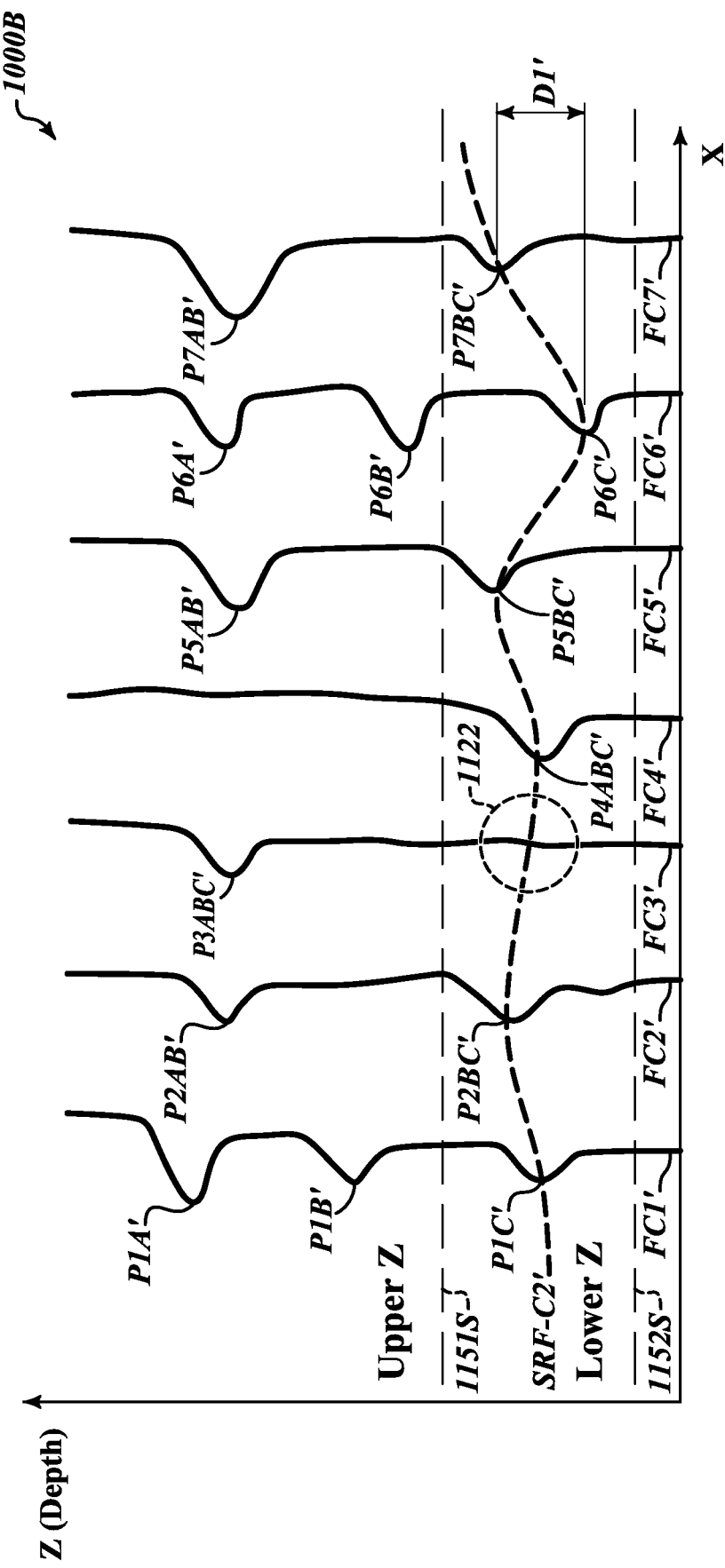

As will be described in more detail below, FIGS. 5-7 are flow diagrams illustrating various exemplary processes (e.g., for displaying images of surfaces and performing measurements), while FIGS. 8A-8B are diagrams illustrating various user interface features (e.g., for displaying images of the surfaces SRF-A and SRF-B of FIG. 4 and performing measurements), and FIGS. 9-10B are diagrams illustrating additional examples of focus curves and various user interface features.

FIG. 5 is a flow diagram illustrating an exemplary process 500 for displaying an image of a surface and performing measurements. In various implementations, the process 500 may be implemented at least in part by the transparent workpiece surface mode portion 140ss of FIG. 2, or the transparent workpiece surface mode 340ts of FIG. 3, either as part of a separate selectable mode and/or video tool, and/or by other components/portions of the system. At a decision block 505, a determination is made as to whether pattern projection is to be utilized. If pattern projection is to be utilized, the process proceeds to a block 507, where pattern projection is switched on for the acquisition of a first image stack, as will be described in more detail below with respect to block 510.

It will be appreciated that in various implementations, the reliable reconstruction of certain types of surfaces (e.g., upper transparent or semi-transparent surfaces and/or certain lower surfaces, etc.) may be inhibited (e.g., due to a lack of texture of the surfaces as viewable by the imaging system or otherwise). In order to enable accurate reconstruction/imaging/display of such surfaces (e.g., for EDOF or 3D images, etc.), confocal pattern projection (e.g., including a pattern of geometric shapes, such as small squares, triangles, circles, lines, etc., distributed in a regular or irregular (random) pattern, that may be projected in combination with the light from the light source that is utilized to illuminate the workpiece for the imaging or otherwise) may be utilized for making the surfaces more detectable (e.g., for determining the Z-height locations of the surfaces in accordance with the determined local focus peaks as determined from the image data with the pattern as projected on the surfaces). In various implementations, the pattern projection may be provided by a pattern projection portion (e.g., pattern projection portion 330') for which the switching on of the pattern projection may include switching on or positioning a pattern element (e.g., including a pattern on a glass or other substrate, such as chrome on glass, etc.) of the pattern projection portion and/or switching on an associated light source (e.g., light source 330 or other light source of the pattern projection portion 330' which in various implementations may also include or be utilized in combination with one or more lenses etc. as part of confocal pattern projection, etc.) In various implementations, the utilization of the pattern projection results in at least some higher local focus peaks in the focus curves than would result from the same image acquisition process and conditions (e.g., including the same lighting) but without the pattern projection. Hence, in various implementations using pattern projection to acquire contrast curves and strong focus peaks may be a preferred embodiment.

Once the pattern projection is switched on at the block 507, or if pattern projection is not to be utilized, the process proceeds to a block 510. At the block 510, an image stack is acquired (e.g., with pattern projection if switched on) utilizing an optical system with an optical axis (e.g., as illustrated in FIGS. 1-3), wherein each image of the plurality of images of the image stack includes a first surface that is at least one of transparent or semi-transparent, and a second surface that is at least partially viewable/visible through the first surface. In various implementations, the acquiring of the image stack may include initially determining a plurality of (typically overlapping) regions of interest (e.g., in an XY plane) on the workpiece (e.g., regions of interest including portions of the first and second surfaces to be imaged and/or for which Z-heights and Z-height quality meta-data may be determined, etc.) The images of the image stack may then be acquired, as including the regions of interest, and for which the image stack comprises member images acquired at corresponding Z-heights (e.g., which may be known Z-heights) within a focus range. At a block 520, a plurality of focus curves are determined for the regions of interest based on the images of the image stack. At a block 530, a sub-process is performed for determining at least a first local focus peak from each focus curve that corresponds to the first surface and a second local focus peak from each focus curve that corresponds to the second surface, as will be described in more detail below with respect to FIG. 6.

At a block 540, data (e.g., an array, a list, etc.) of image indexes for local focus peaks (e.g., for each pixel) in the first image stack is determined and stored. At a decision block 550, a determination is made as to whether EDOF images are to be available for display. If EDOF images are to be available, the process proceeds to a decision block 560, where a determination is made as to whether pattern projection was utilized for the acquisition of the first image stack. If pattern projection was utilized for the acquisition of the first image stack, the process proceeds to a block 570, where a second image stack is acquired utilizing the same capture parameters (e.g., XY position, Z range, Z pitch) for each of the images as was utilized for the acquisition of the first image stack, but for which the second image stack is acquired without any pattern projection.

As noted above, the second image stack may be captured without pattern projection (e.g., with "clean" versions of the images/image data of the surfaces without a pattern projected on the surfaces). As will be described in more detail below, in various implementations the determined local focus peaks from the first image stack are utilized for determining what image data from the second image stack corresponds to a particular surface and will be used for the display of the surface. More specifically, the "clean" image data from the second image stack is utilized for the reconstruction and/or display of an image (e.g., an EDOF image) of a particular surface (i.e., for which the determinations of which image data to utilize from the second "clean" image stack is made in accordance with the indexes of the local focus peaks as determined from the first image stack).

Once the second image stack is acquired at block 570, or if it was determined that no EDOF images are to be available at block 550, or if it was determined that no pattern projection was utilized for the acquisition of the first image stack at block 560, the process proceeds to a block 580. At the block 580, a sub-process is performed displaying surfaces and performing measurements, as will be described in more detail below with respect to FIG. 7.

FIG. 6 is a flow diagram illustrating an exemplary sub-process 530 for determining first and second local focus peaks from each focus curve that correspond to first and second surfaces, respectively. In various implementations, any of the processes and/or sub-process as described herein may be, or may be implemented as part of, a method, routine, sub-routine, etc. At a block 610, local focus peaks of the focus curves are determined. In various implementations, the determination of the local focus peaks may include determining a focus peak determining data set (e.g., for a focus curve) for each region of interest based on the image stack set, wherein the focus peak determining data set comprises focus metrics based on the (typically overlapping)

regions of interest in the member images. In various implementations, local focus peaks may be determined (e.g., for at least some of the focus curves/regions of interest as including first and second local focus peaks as corresponding to the first and second surfaces) as based on the focus peak determining data set for the region of interest (e.g., as corresponding to the focus curve for the region of interest). As noted above, in various implementations, as part of the analysis a focus curve may be divided into, or otherwise be determined to include, different portions for which a different local focus peak may be determined for each portion of the focus curve.

At a block 620, local focus peaks are eliminated that do not fulfill quality criteria. For example, certain criteria may be utilized that are similar to quality measures that are utilized in known points from focus algorithms. In various implementations, the elimination of the local focus peaks that do not fulfill the quality criteria may be performed in conjunction with the operations of block 610. With respect to the operations of blocks 610 and 620, in various implementations certain particular types of quality criteria may be utilized and adjusted for preserving the most significant local focus peaks. For example, the focus curves may be smoothed, local focus peaks may be filtered based on peak maximum value (magnitude), shape and/or local prominence, filtering may be performed based on minimum allowable Z distance between the different local focus peaks, filtering may be performed based on an expected number of local focus peaks (e.g., in certain implementations only the two highest local focus peaks may be preserved), etc.

At a decision block 630, a determination is made as to whether local focus peaks are to be interpolated. If local focus peaks are to be interpolated, the sub-process proceeds to a block 640, where interpolation is performed for the local focus peaks. In various implementations, such processes may be performed for achieving better Z accuracy for the determined surface locations. For example, as will be described in more detail below with respect to FIG. 9, a local focus peak may be interpolated in a focus curve, and for which the data corresponding to the interpolated local focus peak may be marked or otherwise indicated (e.g., for indicating an interpolated local focus peak in a corresponding 2D EDOF or 3D image, etc. as based on interpolated data for the given focus curve). In various implementations, the interpolation of local focus peaks may not be utilized/needed if only 2D EDOF images of surfaces are provided (e.g., without providing 3D images of surfaces). More specifically, due to the nature of how the 2D EDOF images appear, an occasional missing local focus peak may not produce a significant visual difference in the overall appearance of the surface in the image, whereas in a 3D image, such differences may be more visible/obvious/noticeable in a representation of a surface.

At a decision block 650, a determination is made as to whether the remaining local focus peaks are to be sorted. If the remaining local focus peaks are to be sorted, the sub-process proceeds to a block 660 where the remaining local focus peaks are sorted. For example, the remaining local focus peaks may be sorted according to a type of structure or order (e.g., ascending, descending, etc.) according to the Z location of each of the local focus peaks in each of the focus curves. In various implementations, each of the local focus peaks in a focus curve may be numbered, such as in an ascending and/or descending order relative to the Z location in each of the focus curves. For example, each of the first local focus peaks in each of the focus curves may be given/assigned a same number or designation (e.g., local focus peak 1), while each of the second local focus peaks in each of the focus curves may be similarly given/assigned a same number or designation (e.g., local focus peak 2). After such procedures, all of the local focus peaks may be sorted (e.g., such that all of the first local focus peaks from each of the focus curves are determined/designated/grouped together as corresponding to the first surface, and all of the second local focus peaks are determined/designated/grouped together as corresponding to the second surface, etc.).

At a decision block 670, a determination is made as to whether Z-range filtering is to be utilized. If Z-range filtering is to be utilized, the sub-process proceeds to a block 680, wherein Z parameters (e.g., as set by a user) for the Z-range filtering are determined and utilized for filtering the local focus peaks according to the ones that fall or do not fall within the specified Z range. A user interface which provides options to a user for setting Z parameters for Z-range filtering will be described in more detail below with respect to FIGS. 10A and 10B. Once the Z-range filtering is complete, or if no Z-range filtering is to be performed, the sub-process completes and returns the determined local focus peaks.

FIG. 7 is a flow diagram for an exemplary sub-process 580 for displaying surfaces and performing measurements. At a decision block 710, a determination is made if a first surface has been selected (e.g., by a user) for being displayed. If a first surface has been selected for being displayed, the sub-process proceeds to a block 720, where the local focus peak indexes that were stored for the first image stack are utilized to determine what image data (e.g., from the second image stack if acquired, or else from the first image stack) corresponds to the first and second surfaces, etc. For the display/reconstruction of the EDOF image, in an implementation where pattern projection was utilized and a second image stack was acquired, for each XY pixel location, gray-scale values from the images in the second image stack as pointed to by the indexes of the local focus peaks from the first image stack may be utilized to determine the gray-scale values from the images in the second image stack that correspond to each of the surfaces. Similarly, in an implementation where pattern projection was not utilized and only a first image stack was acquired, for each XY pixel location, gray-scale values from the images in the first image stack as pointed to by the indexes of the local focus peaks from the first image stack may be utilized to determine the gray-scale values from the images in the first image stack that correspond to each of the surfaces.

Once the image data as corresponding to the first and second surfaces has been determined, the sub-process proceeds to a block 730, where first image(s) (e.g., a first 2D EDOF image, a first 3D image) is/are displayed which include(s) the first surface and not the second surface, as based on the first local focus peaks and not the second local focus peaks of the focus curves. Once the first image(s) has/have been displayed, or if the first surface has not been selected to be displayed, the sub-process proceeds to a decision block 740.

At the decision block 740, a determination is made if a second surface has been selected (e.g., by a user) for being displayed. If a second surface has been selected for being displayed, the sub-process proceeds to a block 750, where the local focus peak indexes that were stored for the first image stack are utilized to determine what image data (e.g., from the second image stack if acquired, or else from the first image stack) corresponds to the first and second surfaces, etc., (e.g., similar to the operations described above with respect to block 720). Once the image data as corresponding to the first and second surfaces has been determined, the sub-process proceeds to a block 760, where second image(s) (e.g., a second EDOF image, a second 3D image) are displayed which include(s) the second surface and not the first surface, as based on the second local focus peaks and not the first local focus peaks of the focus curves.

Once the second image(s) has/have been displayed, or if the second surface has not been selected to be displayed, the sub-process proceeds to a decision block 770, where a determination is made if any measurements are to be performed on any displayed surfaces (e.g., as displayed as part of the operations of blocks 730 or 760). If measurements are to be performed, the sub-process proceeds to a block 780, where the measurements are performed (e.g., utilizing video tools etc.) on the displayed workpiece surfaces. Once the measurements are performed, or if no measurements are to be performed, the sub-process completes (e.g., and returns any determined measurement data, etc.)

FIGS. 8A and 8B are diagrams illustrating a first implementation of an exemplary user interface 800 for viewing 2D EDOF images and 3D images of surfaces (e.g., such as the surfaces SRF-A and SRF-B of FIG. 4). In various implementations, the user interface 800 may be provided on a display (e.g., a display 16 of FIG. 1, a display device 136 of FIG. 2, etc.) As shown in FIG. 8A, the user interface 800A (i.e., in a first configuration of the user interface 800) includes an EDOF image area 810, a 3D image area 820, a surface selection area 830, and an up/down selection area 840.

In the example of FIG. 8A in the user interface 800A, a user has selected a selection option 831 for "Surface 1" in the surface selection area 830 (e.g., as indicated in the illustration of FIG. 8A by a dotted pattern/highlight within the selected option 831). In various implementations, a user may make the selection by clicking or performing another action (e.g., using a mouse or pointer or other selection mechanism) on the selection option 831, or otherwise by moving a selection indicator 830S to correspond to the selection option 831, etc.

The selection area 830 may also include a selection option 832 for selecting a "Surface 2", as will be described in more detail below with respect to FIG. 8B. In some implementations, the selection area 830 may additionally include a selection option 833 for selecting a "Surface 3", as will be described in more detail below with respect to FIG. 10A. It will be appreciated that in certain implementations the selection option 833 may not be included in the user interface 800 (e.g., in implementations where the system is configured to only determine two surfaces of a workpiece and/or where the system has determined that the workpiece only has two surfaces). Alternatively, in certain implementations, in addition to the third surface "Surface 3", selection options may be provided for selecting additional surfaces (e.g., "Surface 4", "Surface 5", etc.) in accordance with the system being configured to determine additional surfaces (e.g., up to N surfaces, where N is greater than 3, etc.) In various implementations, "Surface 1" of the selection option 831 may correspond to surface SRF-A of FIG. 4. As described above, during part of the processing for determining the surfaces, surface SRF-A may initially be a candidate surface (e.g., as including the local focus peaks P1A-P3A but not the local focus peaks P4AB-P6AB, whereas another candidate upper surface of the workpiece may be designated as including the local focus peaks P1A-P3A and P4AB-P6AB). Once the candidate surfaces are evaluated, a candidate surface (e.g., candidate surface SRF-A) may be designated as a first surface SRF-1 (e.g., an upper surface) on the workpiece to be displayed (e.g., as corresponding to the "Surface 1" of selection option 831). As will be described in more detail below, in various implementations one or more measurements may be determined between features on the selected workpiece surface as displayed, such as based on operations of one or more video tools (e.g., dimension-measuring tools, point tools, box tools, circle tools, arc tools, etc.) as applied to the selected surface in the displayed image.

In various alternative implementations, due to the ambiguity of the local focus peaks P4AB-P6AB in the focus curves FC4-FC6 as corresponding to either the first surface SRF-A or the second surface SRF-B, the EDOF image area 810 and/or the 3D view image area 820 may be made to illustrate a representation of the portion of the surface corresponding to the local focus peaks P4AB-P6AB when the "Surface 1" is selected and/or when the "Surface 2" is selected. In various implementations, the portion of the surface corresponding to the local focus peaks P4AB-P6AB may be specially marked or otherwise indicated in the images (e.g., to indicate the uncertainty as to which surface the local focus peaks P4AB-P6AB correspond to, etc.)

As further shown in the user interface 800A, the up/down selection area 840 includes an "Up" selection option 841 and a "Down" selection option 842 (e.g., for scrolling up or down through the determined surfaces of the workpiece as displayed). In various implementations, in the example of FIG. 8A, the "Up" selection option may be marked (e.g., grayed out, etc.) to indicate that the top/upper surface of the workpiece (i.e., "Surface 1") has already been selected, for which no further upward surface selection may be available for surfaces above "Surface 1" on the workpiece. In contrast, the "Down" selection option 842 may be indicated in the example of FIG. 8A as selectable by a user, as will be described in more detail below with respect to FIG. 8B. In accordance with the selection option 831 (i.e., for "Surface 1") having been selected, the EDOF image area 810 and the 3D view image area 820 both provide corresponding representations of the surface SRF-A of FIG. 4 (i.e., also designated as surface SRF-1).

More specifically, the EDOF image area 810 is shown to include an EDOF image 811, and the 3D image area 820 is shown to include a 3D image 821, each including the surface SRF-1/SRF-A (e.g., as corresponding to the first local focus peaks P1A-P3A of FIG. 4 as well as additional 3D data for the surface). In the illustrated example of FIG. 8A (and with similar principles applied for FIGS. 8B and 10A), for simplicity of the illustrations, 3D data similar to the 2D data for the surfaces of FIG. 4 (e.g., as corresponding to the local focus peaks P1A-P3A of FIG. 4) may be determined for other y-axis locations along the surface, as resulting in other determined local focus peaks (i.e., as part of 3D data) for the surface SRF-A. In general, in the specific examples of FIGS. 8A, 8B and 10A, the Z-heights of the surfaces may be determined to be approximately linear along the y-axis (e.g., having constant Z-heights along the y-axis direction or with a constant slope), as resulting in the corresponding 3D data for the surfaces as illustrated. It will be appreciated that such examples are provided for purposes of simplified illustration only, and that various types of surfaces may have more complex 3D data (e.g., with varying Z-height values as part of slopes/curves etc. along both the x and y-axis directions).

With respect to the EDOF image 811, in accordance with the techniques as disclosed herein, the image is reconstructed from portions (e.g., corresponding to regions of interest and/or pixels at the center of the regions of interest or otherwise) of the image stack that correspond to each of the local focus peaks for the surface (e.g., the local focus peaks P1A-P3A of FIG. 4 as well as other local focus peaks corresponding to 3D data along the y-axis direction of the surface). More specifically, the local focus peaks P1A-P3A and other local focus peaks of the surface SRF-A/SRF-1 correspond to regions of interest/pixels that are determined to be "best focused" at the Z-heights corresponding to the local focus peaks, and for which each of those "best focused" regions of interest/pixels are extracted from the corresponding images of the image stack and are utilized (e.g., stitched together, etc.) to reconstruct/form the 2D EDOF image 811.

As a more specific example, the EDOF image 811 may include a first portion of the surface SRF-A as corresponding to the local focus peak P1A, and for which the portion of the image from the image stack that is utilized for that portion is from the image that was acquired with the focus position of the system as corresponding to local focus peak P1A. Similarly, the EDOF image 811 may include second and third portions of the surface SRF-A as corresponding to the local focus peaks P2A and P3A, respectively, and for which the portions of the images from the image stack that are utilized for those portions are from the images that are acquired with the focus positions of the system as corresponding to local focus peaks P2A and P3A, respectively. Additional local focus peaks may be utilized for determining additional portions of the EDOF image 811. Such processes produce an EDOF image 811 with different portions of the surface SRF-A that are each in focus in the EDOF image (i.e., despite the different portions being at different focus distances from the system). With respect to the 3D image 821, the image may be formed in accordance with known "point cloud" or other techniques for 3D images (e.g., as also corresponding to the first local focus peaks P1A, P2A and P3A and other first local focus peaks as corresponding to different y-axis locations along the surface SRF-A, for which the local focus peaks utilized for the 3D image are the same local focus peaks utilized for the 2D EDOF image.) In various implementations, video tools may be provided for locating, inspecting and/or measuring various features on the workpiece surfaces (e.g., the workpiece surface SRF-1/SRF-A in the 2D EDOF image 811 and/or the 3D image 821). For example, certain features of the surface may be located and/or dimensions of the surface may be measured (e.g., the surface may include certain portions for which the dimensions are to be measured and/or that may be out of tolerance and/or otherwise include flaws or imperfections for which it may be desirable to measure the extent or size of the out of tolerance amounts and/or the flaws or imperfections, etc.) In various implementations, the video tools utilized for such operations (e.g., video tools of the video tool portion 143 such as video tools 143a, 143n, etc. of FIG. 2) may include any of dimension-measuring tools, point tools, box tools, circle tools, arc tools, etc. The operations of such video tools for performing workpiece feature inspection and measurement operations are described in more detail in the previously incorporated references, including in particular the previously incorporated U.S. Pat. Nos. 7,627, 162 and 9,830,694.

In the example of FIG. 8A, the surface SRF-1/SRF-A in the EDOF image 811 is shown to have surface points SA11-SA15 determined, and in the 3D image 821 has surface points SA21-SA25 determined (e.g., in accordance with the operations of one or more video tools, etc.) In some implementations, the surface points SA11-SA15 may correspond to a 2D top view along the z-axis of the surface points SA21-SA25 in the 3D view. As an example, edge detection video tools (e.g., point tools) may be selected and utilized for determining the surface points SA11, SA12, SA14, SA15 and/or the surface points SA21, SA22, SA24, SA25 at the edges of the surface SRF-1/SRF-A in the 2D EDOF image 811 and the 3D image 812, respectively. The surface point SA13 and/or SA23 (e.g., in a central portion of the surface SRF-1/SRF-A) may also be designated or determined (e.g., utilizing video tools or otherwise). In various implementations, video tools may be selected from a video tool selection area (e.g., a selection bar or video toolbar, etc.) of the user interface (e.g., as illustrated in the previously incorporated U.S. Pat. Nos. 7,627,162 and 9,830,694).

Various video tools may also or alternatively be utilized for determining dimensions of the workpiece surface SRF-1/SRF-A. For example, dimension-measuring tools 811A, 812A, 821A, 822A, 823A may be selected (e.g., from a video tool selection area) and utilized for measuring various dimensions on the workpiece surface SRF-1/SRF-A. More specifically, in the 2D EDOF image 811, the dimension measuring tool 811A is utilized to measure a dimension DA11 between the surface points SA13 and SA14, and the dimension measuring tool 812A is utilized to measure a dimension DA12 between the surface points SA13 and SA15. In the 3D image 821, the dimension measuring tool 821A is utilized to measure a dimension DA21 between the surface points SA23 and SA24, the dimension measuring tool 822A is utilized to measure a dimension DA22 between the surface points SA23 and SA25, and the dimension measuring tool 823A is utilized to measure a dimension DA23 along the z-axis direction between a Z-height of the surface point SA22 and a z-height of the surface point SA21.

In various implementations, an image such as that of FIG. 4 may also or alternatively be provided in a user interface, and/or for which video tools or other processes may be utilized for determining dimensions, etc. For example, in FIG. 4 a dimension D1 may be determined/measured as corresponding to a z-axis dimension/distance along the z-axis direction between a Z-height of the local focus peak P1A and a Z-height of the local focus peak P2A (e.g., as may similarly be measured for corresponding surface points on the surface SRF-A in the 3D image 821). As another example, a dimension D2 may be determined/measured between locations on the surfaces SRF-A and SRF-B (e.g., as corresponding a distance between the locations of the local focus peaks P1A and P1B, respectively, as may correspond to the same region of interest at the different Z-heights and thus be along the z-axis direction and thus at the same xy coordinates). In general, any such measurements/determinations for a workpiece (e.g., as described above with respect to FIGS. 4 and 8A) may be with regard to measuring dimensions of workpiece surfaces (e.g., as may be for general dimensions of the workpiece or surfaces, or with respect to measuring the extent or size of certain out of tolerance amounts and/or flaws or imperfections of the workpiece and/or surfaces, etc.)

As shown in FIG. 8B, in the user interface 800B (i.e., a second state of the user interface 800) the user has made a selection or otherwise moved the selection indicator 830S to correspond to the selection option 832 (i.e., as corresponding to "Surface 2") as indicated in the illustration of FIG. 8B by a dotted pattern/highlight within the selected option 832. The principles for forming the illustrated images and the operations of the user interface 800B will be understood to be similar to those of the user interface 800A as described above. In various implementations, the user may move the selection indicator 830S from the selection option 831 to the selection option 832 (i.e., for transitioning from images of "Surface 1" to images of "Surface 2") by selecting (e.g., clicking on) the "Down" selection option 842 (e.g., for moving the views/images from those of the upper "Surface 1" down to those of the lower "Surface 2" of the workpiece).

As shown in FIG. 8B, due to the user selection of option 832 (i.e., for "Surface 2"), the EDOF image area 810 displays an EDOF image 812, and the 3D view image area 820 displays a 3D image 822, each including the second workpiece surface SRF-2/SRF-B (i.e., each image thus corresponding to the local focus peaks P1B-P3B and P4AB-P6AB and other local focus peaks as corresponding to 3D data of the surface SRF-B of FIG. 4). As described above, during part of the processing for determining the surfaces, surface SRF-B may initially be a candidate surface (e.g., as including the local focus peaks P1B-P3B and P4AB-P6AB, whereas another candidate lower surface of the workpiece may be designated as including only the local focus peaks P1B-P3B and not the local focus peaks P4AB-P6AB). Once the candidate surfaces are evaluated, a candidate surface (e.g., candidate surface SRF-B) may be designated as a second surface SRF-2 (e.g., a lower surface) on the workpiece to be displayed (e.g., as corresponding to the "Surface 2" of selection option 832).

In the example of FIG. 8B, the surface SRF-1/SRF-B in the EDOF image 811 is shown to have surface points SB11-SB16 determined, and in the 3D image 821 has surface points SB21-SB26 determined (e.g., in accordance with the operations of one or more video tools, etc.) Various video tools may also or alternatively be utilized for determining dimensions of the workpiece surface SRF-2/SRF-B. For example, dimension-measuring tools 811B, 821B and 823B may be selected and utilized for measuring various dimensions on the workpiece surface SRF-2/SRF-B in the images. More specifically, in the 2D EDOF image 812, the dimension measuring tool 811B is utilized to measure a dimension DB11 between the surface points SB11 and SB13. In the 3D image 822, the dimension measuring tool 821B is utilized to measure a dimension DB21 between the surface points SB21 and SB23, and the dimension measuring tool 823B is utilized to measure a dimension DB23 along the z-axis direction between a Z-height of the surface point SB22 and a Z-height of the surface point SB23.

In various implementations, in some applications an upper (e.g., transparent or semi-transparent) surface of a workpiece (e.g., surface SRF-A) may have certain characteristics that may cause certain amount of distortion in the viewing of a lower surface of the workpiece (e.g., surface SRF-B). In such instances, a determination of certain characteristics of the distortion (e.g., of the type and/or amount of distortion as determined by modeling and/or measurements, etc.) may be made so that adjustments can be made and/or calibration can be performed to help improve the accuracy of the display and/or measurements of the lower surface (e.g., surface SRF-B). In general, it will be appreciated that even in instances where the viewing of the lower surface may have a certain amount of distortion as viewed through the upper surface, the determined 3D data for the lower surface may still have sufficient accuracy for desired measurements. In addition, the viewing of the upper surface (e.g., surface SRF-A as a top surface of the workpiece) may not have such viewing distortions, and for which the display and/or measurements of the upper surface (e.g., surface SRF-A) may correspondingly have a high level of accuracy.

FIG. 9 is a diagram illustrating a second set 900 of focus curves FC1'-FC7' with local focus peaks corresponding to surfaces including at least an upper transparent or semi-transparent surface SRF-A' and a lower surface SRF-C2' that is at least partially viewable through the upper surface. In certain implementations, with more than one local focus peak possible for each pixel, and when the number of local focus peaks may not be constant across an entire image stack, certain surface reconstruction may become relatively ambiguous as illustrated by the different example candidate surfaces SRFA', SRFB1', SRFB2', SRFC1' and SRFC2'.

In the example of FIG. 9, the focus curves FC1' and FC6' are each shown to potentially have three local focus peaks (i.e., P1A'-P1C' and P6A'-P6C', respectively). Focus curves FC2', FC5' and FC7' are shown to have two local focus peaks each. More specifically, focus curve FC2' has local focus peaks P2AB' and P2BC', while focus curve FC5' has local focus peaks P5AB' and P5BC', and focus curve FC7' has local focus peaks P7AB' and P7BC'. Focus curves FC3' and FC4' are each shown to have only one local focus peak (i.e., local focus peaks P3ABC' and P4ABC', respectively).

Depending on different techniques that are utilized for determining the different surfaces corresponding to the different local focus peaks, different candidate surfaces may be determined. For example, a candidate surface SRF-A' may be determined as corresponding to the local focus peaks P1A', P2AB', P3ABC', P5AB', P6A' and P7AB'. A candidate surface SRF-B1' may be determined as corresponding to the local focus peaks P1B', P2BC', P4ABC', P5BC', P6B' and P7ABC'. A candidate surface SRF-B2' may be determined as corresponding to the local focus peaks P1B', P2AB', P3ABC', P4ABC', P5AB', P6A' and P7AB'. A candidate surface SRF-C1' may be determined as corresponding to the local focus peaks P1C', P2BC', P4ABC', P5BC', P6B'. A candidate surface SRF-C2' may be determined as corresponding to the local focus peaks P1C', P2BC', P4ABC', P5BC', P6C' and P7BC'.

In various implementations, with regard to such potential candidate surfaces, in order to address ambiguities and/or make determinations as to which candidate surfaces will be selected as surfaces SRF-1, SRF-2 (e.g., and in some implementations surface SRF-3, etc.) for display, various smoothness constraints and/or error metric minimization (e.g., regularized optimization, etc.) may additionally be utilized to determine/reconstruct the multiple surfaces with a higher degree of reliability (e.g., thus potentially eliminating some of the candidate surfaces from consideration, etc.) In addition, in various implementations all of the local focus peaks may be treated as 3D points and included in 3D data (e.g., to be displayed in a point cloud format). However, such approaches may not have the capability of easy/less complex selection of workpiece surfaces for display in EDOF images (e.g., based on PFF) and/or 3D images, as disclosed herein (e.g., as may simplify operations for non-expert operators, etc.) Nevertheless, in some implementations, such approaches (e.g., in which all of the local focus peaks may be treated as 3D points and included in 3D data) may be provided as an optional feature (e.g., for being utilized in combination with and/or in addition to the techniques as disclosed herein and as potentially providing additional visualization and/or uses of the 3D data, etc.)

In various implementations, the first local focus peaks that correspond to a first surface SRF-1' to be displayed (e.g., as may correspond to the candidate surface SRF-A') may be determined based on all of the first local focus peaks (e.g., P1A', P2AB', P3ABC', P5AB', P6A' and P7AB') sharing a same first numbered position (e.g., a first local focus peak) in each of the focus curves. In such an implementation, the local focus peak P4ABC' may also initially be included (i.e., as corresponding to the first and only local focus peak of the focus curve FC4'). Additional techniques may be utilized to filter the local focus peak P4ABC' from the local focus peaks utilized/designated for the surface SRF-1'/SRF-A' (e.g., as not fulfilling a specified quality criteria, or not falling within a Z filtering range as set by a user for the designated surface, or based on surface smoothness constraints or error metric minimization, etc.)

As another example, the local focus peaks that correspond to the surface SRF-3' (or SRF-2' in some implementations) to be displayed (e.g., as may correspond to the candidate surface SRF-C2') may be determined based on all of the local focus peaks (e.g., P1C', P2BC', P4ABC', P5BC', P6C' and P7BC') sharing a same numbered position in each of the focus curves. For example, the local focus peaks may also or alternatively be counted/numbered from the bottom to the top, for which the local focus peaks P1C', P2BC', P4ABC', P5BC', P6C' and P7BC' would each be a first counted/numbered local focus peak in such an order. In such an implementation, the local focus peak P3ABC' may also initially be included (i.e., as corresponding to the first and only local focus peak of the focus curve FC3'). Additional techniques may be utilized to filter the local focus peak P3ABC' from the local focus peaks utilized/designated for the surface SRF-C2'/SRF-3' (or SRF-2' in some implementations) (e.g., as not fulfilling a specified quality criteria, or not falling within a Z filtering range as set by a user for the designated surface, or based on surface smoothness constraints or error metric minimization, etc.) As described above, in various implementations it may be desirable to limit the number of surfaces determined to 2 surfaces. In such implementations, the surface SRF-C2' may correspond to a second surface SRF-2' to be displayed/viewed/measured, etc.

In various implementations, an image such as that of FIG. 9 may also or alternatively be provided in a user interface, and/or for which video tools or other processes may be utilized for determining certain dimensions/measurements, etc. For example, a dimension D1' may be determined/measured as corresponding to a z-axis dimension/distance along the z-axis direction between a Z-height of the local focus peak P6C' and a Z-height of the local focus peak P7BC' (e.g., as may similarly be measured for corresponding surface points on the surface SRF-C2' in the 3D image 823 of FIG. 10A, as will be described in more detail below). As another example, a dimension D2' may be determined/measured between locations on the candidate surfaces SRF-A' and SRF-C2' (e.g., as corresponding a distance/dimension between the locations of the local focus peaks P7AB' and P7BC', as may correspond to the same region of interest at the different Z-heights and thus be along the z-axis direction and thus at the same xy coordinates/position).

FIGS. 10A and 10B are diagrams illustrating a second exemplary implementation of a user interface 1000 for viewing 2D EDOF images and 3D images of surfaces (e.g., such as the surfaces of FIG. 9). The user interface 1000 is similar to the user interface 800 of FIGS. 8A and 8B as described above, and will be understood to operate similarly, except as otherwise described below. As shown in FIG. 10A, in the user interface 1000 a user has made a selection of the selection option 833 (i.e., as corresponding to "Surface 3") as indicated in the illustration of FIG. 10A by a dotted pattern/highlight within the selected option 833. In various implementations, the user may move the selection to the selection option 833 by selecting (e.g., clicking on) the "Down" selection option 842 (e.g., for moving the selection from an upper surface down to the lower "Surface 3" of the workpiece). As described above, in various implementations it may be desirable to limit the number of surfaces determined to 2 surfaces. In such implementations, the surface SRF-C2' may correspond to a second surface SRF-2', for which the only selection options presented in the user interface 1000 may be the selection options 831 and 832, and for which the user interface 1000 would indicate a selection of the selection option 832 for viewing/measuring etc. the lower surface SRF-C2'.

One difference of the user interface 1000 relative to the user interface 800, is that the user interface 1000 additionally includes a Z-range selection area 1050 and a filter local focus peaks selection area 1060. The filter local focus peaks area 1060 includes a selection option 1061 (e.g., a radio button) for filtering by "Numbered Position" (e.g., in accordance with the local focus peaks sharing a same numbered position in each of the focus curves as described herein) and a selection option 1062 (e.g., a radio button) for filtering by "Z-Range" (e.g., as will be described in more detail below with respect to the Z range selection area 1050). In various implementations, the selection options 1061 and 1062 may be representative of exclusive choices (e.g., wherein a user can select to filter the local focus peaks based on one or the other), or there may be options for utilizing a combination of such filtering functions (e.g., where the user interface is configured to allow a user to select both selection options 1061 and 1062) and for which certain combinations of such filtering functions may be applied.

The Z-range selection area 1050 (e.g., as may be displayed and/or enabled in accordance with the selection of the selection option 1062) includes a first slider 1051 (i.e., for setting an upper Z-range value) and a second slider 1052 (i.e., for setting a lower Z-range value). The first slider 1051 includes a movable pointer 1051S that is movable/adjustable (e.g., by a user) to set an upper Z value for the Z range. The second slider 1052 includes a movable pointer 1052S that is movable/adjustable (e.g., by a user) to select a lower Z value for the Z range. As will be described in more detail below with respect to FIG. 10B, by setting the upper and lower Z values of the Z range as indicated in FIG. 10A, certain local focus peaks corresponding to the candidate surface SRF-C2' may be filtered and/or selected/determined.

With respect to the illustrations of the Z range and the filtering/selection/determination of local focus peaks as corresponding to the candidate surface SRF-C2', various techniques may be utilized. For example, in various implementations, a local focus peak may be determined from a focus curve that corresponds to a surface but which does not share the same numbered position in the respective focus curve as the other local focus peaks corresponding to the surface, wherein the local focus peak is instead determined based on falling within a Z filtering range that is set by a user. With respect to the surface SRF-C2' in FIG. 10B, in one application the local focus peaks P2BC', P5BC' and P7BC' may each be determined as corresponding to the surface SRF-C2' due to each sharing a same numbered position (e.g., a second numbered position in a top-to-bottom counting/numbering order) in each of the focus curves FC2', FC5' and FC7'. Then, additional local focus peaks P1C' and P6C' may also be determined as corresponding to the surface SRF-C2' (e.g., due to falling within the Z filtering range as indicated by the upper Z range value 1151S and the lower Z range value 1152S, even though the additional local focus peaks may be in a third numbered position in their respective focus curves and may thus not share a same numbered position as the other local focus peaks P2BC', P5BC' and P7BC').

As another example, the local focus peaks P1C' and P6C' may each be determined as corresponding to the surface SRF-C2' due to each sharing a same numbered position (e.g., a third numbered position in a top-to-bottom counting/numbering order) in each of the focus curves FC1 and FC6'. Additional local focus peaks P2BC', P5BC' and P7BC' may also be determined as corresponding to the surface SRF-C2' (e.g., due to falling within the Z filtering range as indicated by the upper Z range value 1151S and the lower Z range value 1152S, even though the additional local focus peaks may be in a second numbered position in their respective focus curves and may thus not share a same numbered position as the other local focus peaks P1C' and P6C').

In general, it will be appreciated that even in an application where a Z filtering range is utilized to assist with the determination of the local focus peaks that correspond to a surface, in accordance with the techniques disclosed herein an additional surface (e.g., candidate surface SRF-A' of FIG. 9) may not require the utilization of a Z filtering range for the determination of the corresponding local focus peaks. For example, as noted above, in various implementations the local focus peaks that correspond to the surfaces may initially be determined based on the local focus peaks sharing a same numbered position in each of the focus curves. As also noted above, a first surface SRF-1' to be displayed (e.g., as may correspond to the candidate surface SRF-A') may be determined based on all of the first local focus peaks (e.g., P1A', P2AB', P3ABC', P5AB', P6A' and P7AB') sharing a same first numbered position (e.g., a first local focus peak in a top-to-bottom counting) in each of the focus curves. In regard to such processes, even if a Z filtering range is utilized to assist with the determination of the corresponding local focus peaks for an additional surface (e.g., the surface SRF-C2'), the determining of the local focus peaks for the other surface (e.g., a first upper surface such as surface SRF-1'/SRF-A') may not include the utilization of a Z filtering range.

In various implementations, an interpolated local focus peak may be determined for a focus curve that does not include a local focus peak corresponding to a surface based on interpolating between at least two local focus peaks of other focus curves that correspond to the surface. For example, as illustrated in FIG. 10B, the focus curve FC3' may include a local focus peak P3ABC' (e.g., that is determined to correspond to the candidate surface SRF-A' as illustrated in FIG. 9), but which does not include a local focus peak that is determined to correspond to the candidate surface SRF-C2'. With respect to the local focus peak P2BC' of the focus curve FC2', and the local focus peak P4ABC' of the focus curve FC4', an "interpolated" local focus peak for the focus curve FC3' may be determined (e.g., as falling within the area 1122) as corresponding to the surface SRF-C2' based on interpolating between the local focus peaks P2BC' and P4ABC' that correspond to the surface SRF-C2'.

In the example of FIG. 10A, the surface SRF-3/SRF-C2' in the EDOF image 813 is shown to have surface points SC11-SC16 determined, and in the 3D image 823 has surface points SC21-SC26 determined (e.g., in accordance with the operations of one or more video tools, etc.) Various video tools may also or alternatively be utilized for determining dimensions of the workpiece surface SRF-2/SRF-C2'. For example, dimension-measuring tools 1011C, 1012C, 1021C, 1022C and 1023C may be selected and utilized for determining (e.g., measuring) various dimensions on the workpiece surface SRF-2/SRF-C2'. More specifically, in the 2D EDOF image 813, the dimension measuring tool 1011C is utilized to determine (e.g., measure) a dimension DC11 between the surface points SC14 and SC15, and the dimension measuring tool 1012C is utilized to measure a dimension DC12 between the surface points SA14 and SA16. In the 3D image 823, the dimension measuring tool 1021C is utilized to measure a dimension DC21 between the surface points SC24 and SC25, the dimension measuring tool 1022C is utilized to measure a dimension DC22 between the surface points SC24 and SC26, and the dimension measuring tool 1023C is utilized to measure a dimension DC23 along the z-axis direction between a Z-height of the surface point SC22 and a Z-height of the surface point SC23.

In the example of FIG. 10A, the surface SRF-3/SRF-C2' in the EDOF image 813 is shown to also have indicator areas 1015C and 1016C determined and displayed, and the 3D image 823 has indicator areas 1025C and 1026C determined and displayed. In various implementations certain focus curves (e.g., focus curve FC3') may not have a local focus peak that corresponds to a surface (e.g., surface SRF-C2') and/or may have no local focus peaks, for which such results may in some instances be correspondingly marked in a 2D EDOF image (e.g., in 2D EDOF image 813 as indicated by the indicator area 1015C, as may indicate no data, with a specified color, pattern, or otherwise as part of the indicator area). Such results may in some instances also or alternatively be marked in a 3D image (e.g., in 3D image 823 as indicated by the indicator area 1025C, as may indicate not a number NaN, or otherwise as part of the indicator area for indicating an undefined or unrepresentable value in the 3D image 823).

In various implementations, the indicator areas 1016C and 1026C in the 2D EDOF image 813 and the 3D image 823 may indicate a particular portion or feature of the surface SRF-3/SRF-C2' (e.g., as may be out of tolerance and/or otherwise include a flaw or imperfection). For example, the local focus peak PC6' and/or a corresponding surface point SC22 may correspond to a drop or dip in the surface SRF-3/SRF-C2' relative to the other local focus peaks/surface points that is not supposed to be in the surface and may indicate and/or correspond to a flaw or imperfection in the surface. In various implementations, the dimensions of the indicator areas 1016C and 1026C may correspond to the dimensions of the portion of the surface that is out of tolerance and/or the dimensions of the flaw or imperfection (e.g., as indicating to a user the size of the portion of the surface with the issues and/or as may assist with the measurement/determination of the size of the portion of the surface with the issues).

In various implementations, an image such as that of FIG. 10B may also or alternatively be provided in a user interface, and/or for which video tools or other processes may be utilized for determining dimensions/measurements, etc. For example, with respect to the surface SRF-C2', a dimension D1' may be determined/measured as corresponding to a z-axis dimension/distance along the z-axis direction between a Z-height of the local focus peak P6C' and a Z-height of the local focus peak P7BC' of the surface SRF-C2' (e.g., as may similarly be measured for corresponding surface points on the surface SRF-C2' in the 3D image 823 of FIG. 10A).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
a light source;
a lens that inputs image light arising from surfaces of a workpiece which are illuminated by the light source, and transmits the image light along an imaging optical path;
a camera that receives imaging light transmitted along the imaging optical path and provides images of the workpiece, wherein a focus position of the system is configured to be variable over a plurality of positions within a focus range along a Z height direction proximate to the workpiece;
one or more processors; and
a memory coupled to the one or more processors and storing program instructions that when executed by the one or more processors cause the one or more processors to at least:
acquire an image stack comprising a plurality of images, wherein each image of the image stack is acquired at a different corresponding Z-height within a focus range, and each image of the image stack includes a first surface of the workpiece that is at least one of transparent or semi-transparent and a second surface of the workpiece that is at least partially viewable through the first surface;
determine a plurality of focus curves based on the images of the image stack;
determine a first local focus peak from each focus curve that corresponds to the first surface and a second local focus peak from each focus curve that corresponds to the second surface;
display a first displayed image including a first selected surface that is selected by a user in accordance with an option for selecting either the first surface or the second surface, wherein the first selected surface is one of:
the first surface, for which the first displayed image includes the first surface and not the second surface that is at least partially viewable through the first surface, as based on the first local focus peaks and not the second local focus peaks; or
the second surface that is at least partially viewable through the first surface, for which the first displayed image includes the second surface and not the first surface, as based on the second local focus peaks and not the first local focus peaks.

2. The system of claim 1, wherein the acquiring of the image stack comprises projecting a pattern onto the first and second surfaces which results in at least some higher local focus peaks in the focus curves than would result from the same image acquisition process and conditions but without the projected pattern.

3. The system of claim 2, wherein the program instructions when executed by the one or more processors further cause the one or more processors to acquire a second image stack without utilizing the pattern projection, and for which the first local focus peaks are utilized for determining what image data from the second image stack corresponds to the first surface, wherein the first selected surface is the first surface and the image data from the second image stack that corresponds to the first surface is utilized for the displaying of the first displayed image which includes the first surface.

4. The system of claim 1, wherein the first displayed image is a first displayed 2 dimensional (2D) extended depth of field (EDOF) image which includes the first selected surface.

5. The system of claim 4, wherein the program instructions when executed by the one or more processors further cause the one or more processors to also display a first displayed 3 dimensional (3D) image which includes the first selected surface, as based on the same local focus peaks that the first displayed 2D EDOF image is based on.

6. The system of claim 1, wherein the first displayed image is a first displayed 3D image which includes the first selected surface.

7. The system of claim 1, wherein the program instructions when executed by the one or more processors further cause the one or more processors to determine a dimension between two features on the first selected surface based on operations of one or more video tools as applied to the first selected surface in the first displayed image.

8. The system of claim 7, wherein the one or more video tools comprise at least one of a dimension-measuring tool, point tool, box tool, circle tool, or arc tool.

9. The system of claim 1, wherein the program instructions when executed by the one or more processors further cause the one or more processors to display at a different time a second displayed image of a second selected surface that is selected by a user in accordance with an option for selecting either the first surface or the second surface, wherein the second selected surface is one of:
the second surface when the first selected surface is the first surface, for which the second displayed image includes the second surface and not the first surface, as based on the second local focus peaks and not the first local focus peaks;
the first surface when the first selected surface is the second surface, for which the second displayed image includes the first surface and not the second surface, as based on the first local focus peaks and not the second local focus peaks.

10. The system of claim 9, wherein the first and second displayed images are first and second displayed 2D EDOF images, respectively.

11. The system of claim 10, wherein the program instructions when executed by the one or more processors further cause the one or more processors to:
display at a same time as the first displayed 2D EDOF image a first displayed 3D image which includes the first selected surface, as based on the same local focus peaks that the first displayed 2D EDOF image is based on; and
display at a same time as the second displayed 2D EDOF image a second displayed 3D image which includes the second selected surface, as based on the same local focus peaks that the second displayed 2D EDOF image is based on.

12. The system of claim 1, wherein the first local focus peaks that correspond to the first surface are determined based on the first local focus peaks sharing a same first numbered position in each of the focus curves, and the second local focus peaks that correspond to the second surface are determined based on the second local focus peaks sharing a same second numbered position in each of the focus curves.

13. The system of claim 12, wherein the program instructions when executed by the one or more processors further cause the one or more processors to determine a local focus peak from a focus curve that corresponds to the second surface but which does not share the same second numbered position in the respective focus curve, wherein the local focus peak is determined based on falling within a Z filtering range that is set by a user.

14. The system of claim 1, wherein the determining of the first and second local focus peaks that correspond to the first and second surfaces, respectively, comprises eliminating from consideration one or more local focus peaks of the focus curves that do not fulfill at least one specified quality criteria.

15. The system of claim 1, wherein the program instructions when executed by the one or more processors further cause the one or more processors to determine at least one interpolated local focus peak for a focus curve that does not include a local focus peak corresponding to a surface based on interpolating between at least two local focus peaks of other focus curves that correspond to the surface.

16. The system of claim 1, wherein the lens that inputs the image light arising from surfaces of the workpiece is an objective lens, and the system further comprises:
  a tunable acoustic gradient (TAG) lens, wherein the objective lens transmits the workpiece light along the imaging optical path that passes through the TAG lens; and
  a TAG lens controller that controls the TAG lens to periodically modulate the optical power of the TAG lens over a range of optical powers at an operating frequency so as to vary the focus position of the system over a plurality of positions within a focus range along a Z height direction proximate to the workpiece.

17. The system of claim 1, wherein the program instructions when executed by the one or more processors further cause the one or more processors to present in a user interface the option for selecting between the first surface and the second surface.

18. The system of claim 1, wherein the system is configured to only determine the first and second local focus peaks that correspond to the first and second surfaces, respectively, and is not configured to determine additional local focus peaks of the focus curves such as may correspond to additional surfaces of the workpiece that may be at least partially viewable through the first surface.

19. A computer-implemented method for operating a metrology system comprising a light source, a lens that inputs image light arising from surfaces of a workpiece which are illuminated by the light source and transmits the image light along an imaging optical path, and a camera that receives imaging light transmitted along the imaging optical path and provides images of the workpiece, wherein a focus position of the system is configured to be variable over a plurality of positions within a focus range along a Z height direction proximate to the workpiece, the computer-implemented method comprising:
  under control of one or more computing systems configured with executable instructions,
    acquiring an image stack comprising a plurality of images, wherein each image of the image stack is acquired at a different corresponding Z-height within a focus range, and each image of the image stack includes a first surface that is at least one of transparent or semi-transparent and a second surface that is at least partially viewable through the first surface;
    determining a plurality of focus curves based on the images of the image stack;
    determining a first local focus peak from each focus curve that corresponds to the first surface and a second local focus peak from each focus curve that corresponds to the second surface;
    displaying a first displayed image including a first selected surface that is selected by a user in accordance with an option for selecting either the first surface or the second surface, wherein the first selected surface is one of:
      the first surface, for which the first displayed image includes the first surface and not the second surface that is at least partially viewable through the first surface, as based on the first local focus peaks and not the second local focus peaks; or
      the second surface that is at least partially viewable through the first surface, for which the first displayed image includes the second surface and not the first surface, as based on the second local focus peaks and not the first local focus peaks.

20. The computer-implemented method of claim 19, wherein the acquiring of the image stack comprises projecting a pattern onto the first and second surfaces.

21. The computer-implemented method of claim 19, further comprising determining a measurement between two features on the first selected surface based on operations of one or more video tools as applied to the first selected surface in the first displayed image.

22. The computer-implemented method of claim 19, further comprising determining a plurality of additional local focus peaks from each focus curve that correspond to a plurality of additional respective surfaces.

23. The computer-implemented method of claim 19, wherein the local focus peaks that correspond to a surface are determined based on at least one of:
  at least some of the local focus peaks sharing a same numbered position in each of the focus curves;
  at least some of the local focus peaks falling within a selected Z-range; or
  at least some of the local focus peaks sharing a same numbered position within a selected Z-range.

* * * * *